(12) United States Patent
Mibu et al.

(10) Patent No.: US 11,163,189 B2
(45) Date of Patent: Nov. 2, 2021

(54) DISPLAY DEVICE AND MANUFACTURING METHOD FOR DISPLAY DEVICE

(71) Applicant: Panasonic Liquid Crystal Display Co., Ltd., Himeji (JP)

(72) Inventors: Takashi Mibu, Hyogo (JP); Teruhisa Nakagawa, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 16/359,717

(22) Filed: Mar. 20, 2019

(65) Prior Publication Data

US 2019/0302500 A1  Oct. 3, 2019

(30) Foreign Application Priority Data

Mar. 30, 2018 (JP) .............................. JP2018-069396

(51) Int. Cl.
*G02F 1/1335* (2006.01)
*G02F 1/1339* (2006.01)

(52) U.S. Cl.
CPC ...... *G02F 1/133512* (2013.01); *G02F 1/1339* (2013.01); *G02F 1/13394* (2013.01);
(Continued)

(58) Field of Classification Search
CPC .. G02F 1/1335; G02F 1/1339; G02F 1/13394; G02F 1/133512; G02F 1/133514;
(Continued)

(56) References Cited

U.S. PATENT DOCUMENTS

2005/0007525 A1* 1/2005 Jun ..................... G02F 1/13394
349/110
2005/0275768 A1  12/2005 Tsubata et al.
(Continued)

FOREIGN PATENT DOCUMENTS

CN  203164562 U  8/2013
JP  4-318816  11/1992
(Continued)

OTHER PUBLICATIONS

Office Action issued in corresponding Japanese Patent Application No. 2018-069396, dated Dec. 1, 2020, 5 pages.

*Primary Examiner* — Thoi V Duong
(74) *Attorney, Agent, or Firm* — Hamre, Schumann, Mueller & Larson, P.C.

(57) ABSTRACT

A display device comprises: a thin film transistor substrate; a counter substrate disposed to be opposed to the thin film transistor substrate; and a plurality of spacers protruding from the counter substrate toward the thin film transistor substrate, wherein the counter substrate includes: a black matrix including a first opening and a second opening that are adjacent to each other in a first direction; a first color filter being disposed while overlapping with the first opening and the second opening in planar view; and a second color filter being disposed while overlapping with at least a part of a region between the first opening and the second opening in planar view, and a first spacer included in the plurality of spacers overlaps with the second color filter between the first opening and the second opening in planar view.

17 Claims, 28 Drawing Sheets

(52) U.S. Cl.
CPC .. *G02F 1/133514* (2013.01); *G02F 1/133516* (2013.01); *G02F 1/13396* (2021.01)

(58) Field of Classification Search
CPC ............. G02F 1/133516; G02F 1/1368; G02F 1/1333; G02F 1/0107; G02F 1/1362; G02F 2001/13396; G02F 2201/52; H01L 27/322; H01L 27/3262; H01L 27/3211
See application file for complete search history.

(56) References Cited

U.S. PATENT DOCUMENTS

| | | | |
|---|---|---|---|
| 2008/0309859 A1 | 12/2008 | Tsubata et al. | |
| 2009/0153785 A1 | 6/2009 | Iwato et al. | |
| 2011/0205474 A1 | 8/2011 | Iwato et al. | |
| 2014/0168553 A1 | 6/2014 | Park et al. | |
| 2018/0356692 A1* | 12/2018 | Okumoto | ............ G02F 1/13624 |

FOREIGN PATENT DOCUMENTS

| | | |
|---|---|---|
| JP | 2006-023733 | 1/2006 |
| JP | 2009-150916 | 7/2009 |
| JP | 2014-119754 | 6/2014 |
| JP | 2016-031513 | 3/2016 |

\* cited by examiner

DISPLAY DEVICE AND MANUFACTURING METHOD FOR DISPLAY DEVICE

CROSS-REFERENCE TO RELATED APPLICATION

This application claims priority from Japanese application JP 2018-069396, filed Mar. 30, 2018. This Japanese application is incorporated herein by reference.

BACKGROUND

1. Technical Field

The present disclosure relates to a display device and a method for manufacturing the display device.

2. Description of the Related Art

Patent Literature (Unexamined Japanese Patent Publication No. 2014-119754) discloses a display device including a thin film transistor substrate and a counter substrate that is disposed so as to be opposed to the thin film transistor substrate on a display surface side of the thin film transistor substrate. The counter substrate includes a black matrix including a plurality of openings and a plurality of color filters disposed so as to overlap with the opening in planar view, and the plurality of color filters are disposed in a stripe shape.

SUMMARY

With the conventional configuration, generation of a variation in tolerance to external force from a direction orthogonal to a display surface becomes problematic in a display surface of a display panel. That is, in the conventional configuration, in the case where a plurality of spacers protruding from the counter substrate toward the thin film transistor substrate are included while thicknesses of the color filters on the black matrix vary, a distance between each spacer disposed so as to overlap with the color filter in planar view and the thin film transistor substrate becomes nonuniform. For this reason, generation of the variation in tolerance to the external force from the direction orthogonal to the display surface becomes problematic in the display surface of the display panel.

An object of the present disclosure is to prevent generation of a variation in tolerance to external force from a direction orthogonal to a display surface, in a display device including a plurality of spacers protruding from a counter substrate toward a thin film transistor substrate.

A display device according to a present disclosure comprises: a thin film transistor substrate; a counter substrate disposed to be opposed to the thin film transistor substrate; and a plurality of spacers protruding from the counter substrate toward the thin film transistor substrate, wherein the counter substrate includes: a black matrix including a first opening and a second opening that are adjacent to each other in a first direction; a first color filter having a first color, the first color filter being disposed while overlapping with the first opening and the second opening in planar view; and a second color filter having a second color, the second color filter being disposed while overlapping with at least a part of a region between the first opening and the second opening in planar view, and a first spacer included in the plurality of spacers overlaps with the second color filter between the first opening and the second opening in planar view.

A manufacturing method for display device according to a present disclosure comprises: a step of preparing a thin film transistor substrate; and a step of forming a counter substrate disposed to be opposed to the thin film transistor substrate, wherein the step of forming the counter substrate includes: a step of forming a black matrix having a first opening and a second opening adjacent to the first opening on a first main surface of a transparent substrate; a step of forming a second color filter precursor having a second color on an entire side of the first main surface of the transparent substrate; a first etching step of removing the second color filter precursor from the first opening and the second opening while leaving the second color filter precursor in at least a partial region between the first opening and the second opening; a step of forming a color filter precursor having a color different from the second color on the entire side of the first main surface of the transparent substrate; and a second etching step of etching the color filter precursor having the color different from the second color to leave the color filter precursor having the color different from the second color formed in the first opening and the second opening.

The display device according to the present disclosure can prevent generation of a variation in tolerance to external force from a direction orthogonal to a display surface.

DETAILED DESCRIPTION

Hereinafter, an exemplary embodiment of the present disclosure will be described with reference to the drawings. In the exemplary embodiment, a liquid crystal display device is described as an example of display device. However the present disclosure is not limited to the liquid crystal display device. For example the present disclosure may be an organic electroluminescence display (OLED) device. In the following description, a plurality of embodiments of a liquid crystal display device will be described. Descriptions of components and functions common to the respective embodiments are appropriately omitted.

Figure 1:
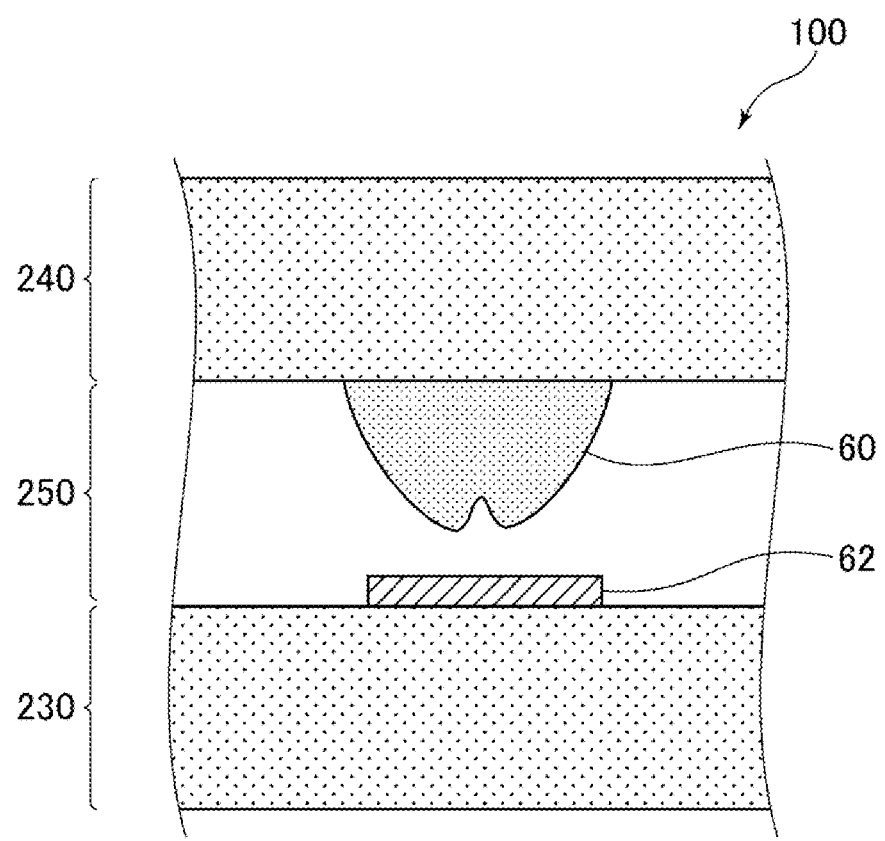
FIG. 1 is a partially sectional view of a display device according to the present disclosure.

FIG. 1 is a partially sectional view of a display device according to the present disclosure. In the present disclosure, display device 100 includes thin film transistor substrate 230 and a counter substrate 240 opposed to thin film transistor substrate 230, and liquid crystal layer 250 is disposed between thin film transistor substrate 230 and counter substrate 240. A plurality of spacers 60 protruding toward thin film transistor substrate 230 are provided on a back surface side of counter substrate 240. Spacer 60 includes main spacer 60A (see FIG. 3) and sub-spacer 60B (see FIG. 3). Main spacer 60A is disposed so as to make contact with pedestal 62 provided on a display surface side of thin film transistor substrate 230 in a normal state, and has a function of keeping a distance between thin film transistor substrate 230 and counter substrate 240 constant in the display surface. Sub-spacer 60B is disposed at a distance from pedestal 62, and has a function of absorbing a pressing load of external force from a direction orthogonal to the display surface. Thus, a height from counter substrate 240 to an apex of main spacer 60A is higher than a height from counter substrate 240 to an apex of sub-spacer 60B. For example, spacer 60 can be formed of an insulating film made of resin, and pedestal 62 can be formed of an island-shaped semiconductor film or a metal film.

First Exemplary Embodiment

Figure 2:
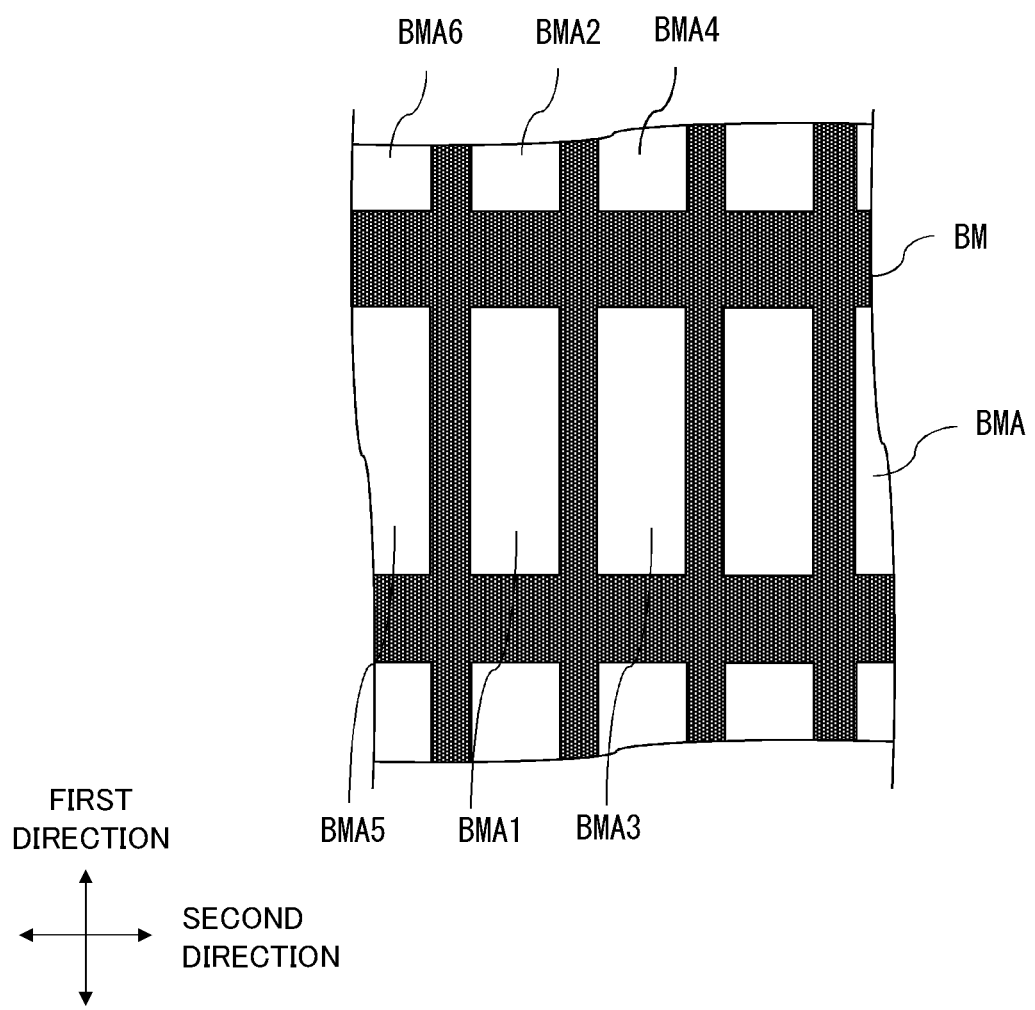
FIG. 2 is a plan view illustrating black matrix included in counter substrate in a first exemplary embodiment.

Hereinafter, display device 100 according to a first exemplary embodiment of the present disclosure will be described with reference to the drawings. FIG. 2 is a plan view illustrating black matrix BM included in counter substrate 240 of the first exemplary embodiment. As illustrated in FIG. 2, black matrix BM includes a plurality of openings BMA arranged in a first direction and a second direction intersecting the first direction. One opening BMA corresponds to one pixel region, and one pixel region includes opening BMA and color filter CF (to be described later) is disposed in opening BMA.

In the first exemplary embodiment, black matrix BM includes first opening BMA1 and second opening BMA2 that are adjacent to each other in the first direction, third opening BMA3 and fourth opening BMA4 that are adjacent to each other in the first direction, and fifth opening BMA5 and sixth opening BMA6 that are adjacent to each other in the first direction.

Figure 3:
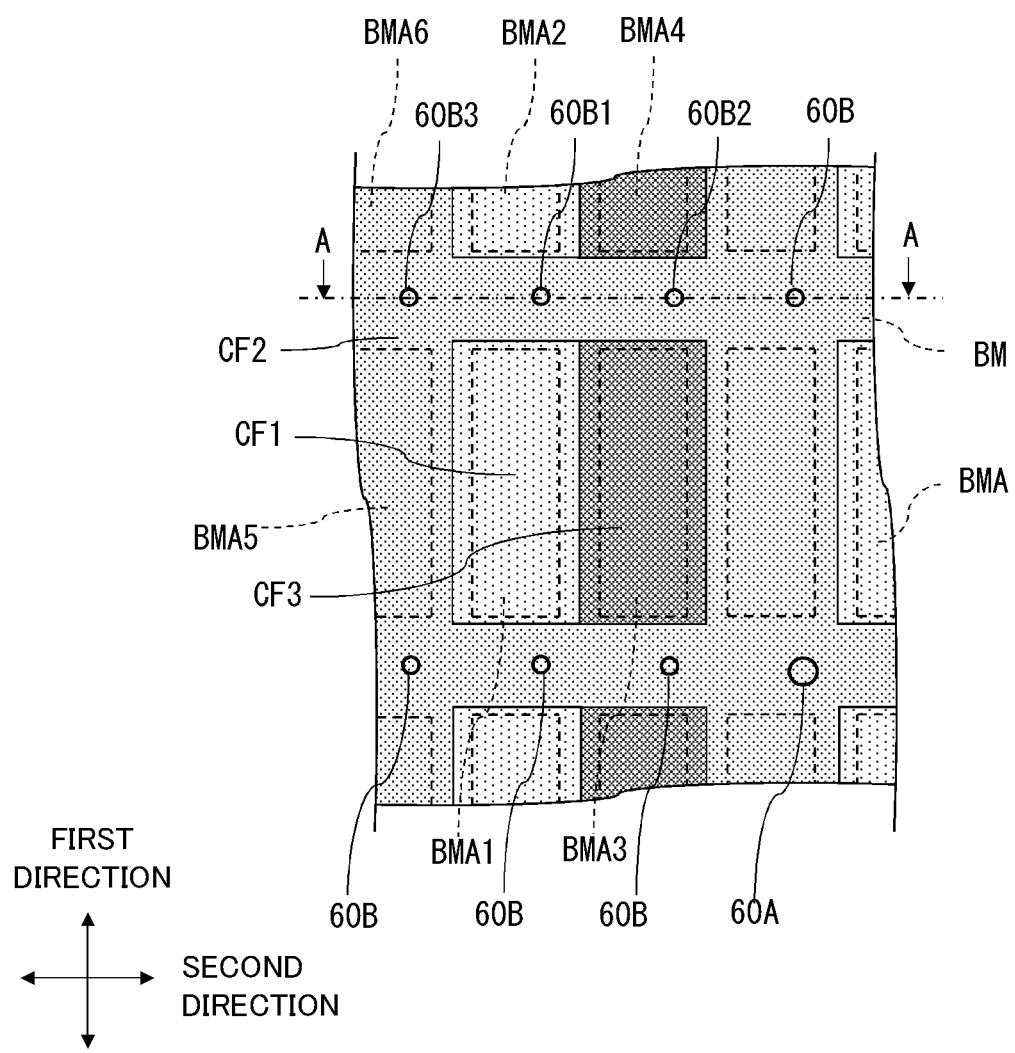
FIG. 3 is a plan view illustrating a configuration of a display device according to a first exemplary embodiment in which color filter and spacer are disposed while overlapping with black matrix.

Counter substrate 240 includes color filter CF that is disposed while overlapping with black matrix BM. FIG. 3 is a plan view illustrating a configuration in which color filter CF and spacer 60 are disposed while overlapping with black matrix BM. As illustrated in FIG. 3, color filter CF is disposed while overlapping with each opening BMA of black matrix BM, and a display color in each pixel region can vary according to a color of color filter CF.

In the first exemplary embodiment, first color filter CF1 having a first color (for example, red) is disposed while overlapping with first opening BMA1 and second opening BMA2 in planar view. Second color filter CF2 (for example, blue) having a second color (for example, blue) is disposed so as to overlap with at least a part in a region between first opening BMA1 and second opening BMA2 that are adjacent to each other in planar view, and first sub-spacer 60B1 is disposed between first opening BMA1 and second opening BMA2 so as to overlap with second color filter CF2 in planar view.

Third color filter CF3 having a third color (for example, green) is disposed so as to overlap with third opening BMA3 and fourth opening BMA4 in planar view. Second color filter CF2 is disposed so as to overlap at least a part in a region between third opening BMA3 and fourth opening BMA4 that are adjacent to each other in planar view, and second sub-spacer 60B2 is disposed between third opening BMA3 and fourth opening BMA4 so as to overlap with second color filter CF2 in planar view.

Second color filter CF2 is disposed while overlapping with fifth opening BMA5, sixth opening BMA6, and at least a part in a region between fifth opening BMA5 and sixth opening BMA6 in planar view. Third sub-spacer 60B3 is disposed between fifth opening BMA5 and sixth opening BMA6 so as to overlap with second color filter CF2 in planar view.

Figure 4:
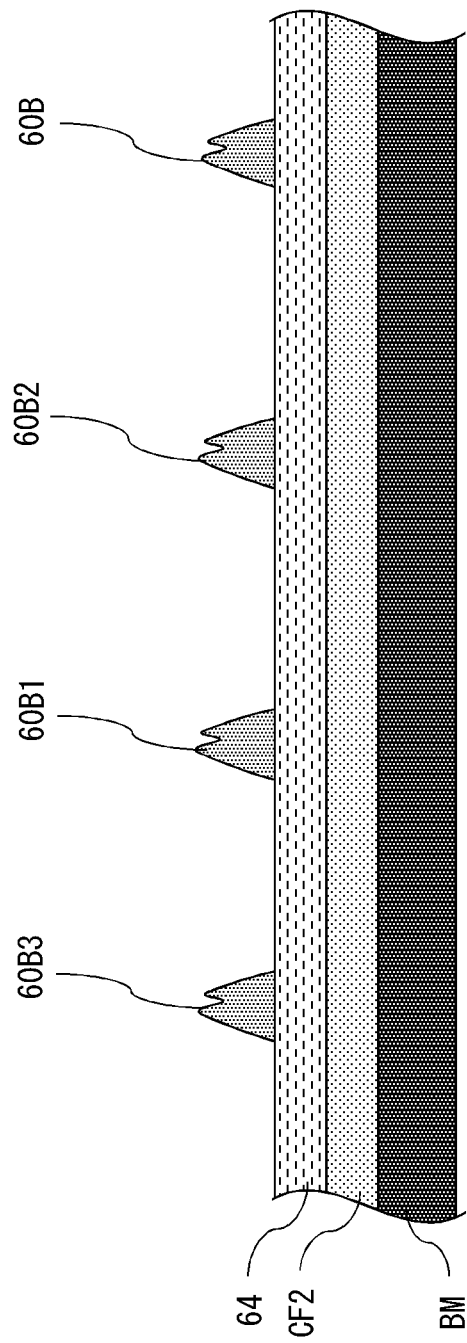
FIG. 4 is a sectional view taken along line A-A in FIG. 3.

With the above configuration, generation of a variation in tolerance to the external force from the direction orthogonal to the display surface can be prevented in the display surface of the display panel. That is, as illustrated in FIG. 4 that is a sectional view taken along line A-A in FIG. 3, first sub-spacer 60B1, second sub-spacer 60B2, and third sub-spacer 60B3 are disposed so as to overlap with second color filter CF2 in planar view, so that a distance between each sub-spacer 60B and thin film transistor substrate 230 can be equalized. As a result, the variation in tolerance to the external force from the direction orthogonal to the display surface can be prevented in the display surface of the display panel. As illustrated in FIG. 4, flattening film 64 may be interposed between color filter CF and each sub-spacers 60B.

Figure 5:
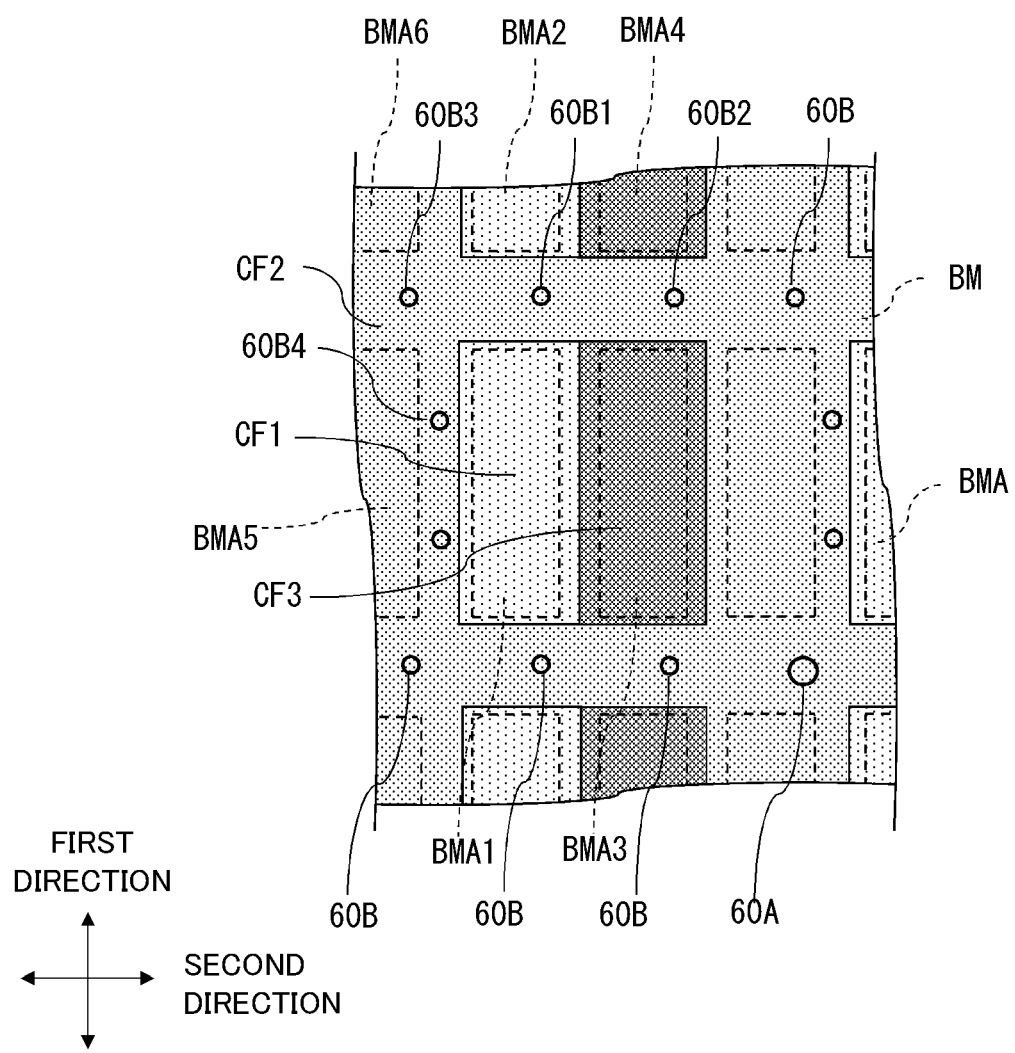
FIG. 5 is a plan view illustrating a configuration of a display device according to another example in a first exemplary embodiment in which color filter and spacer are disposed while overlapping with black matrix.

In the examples of FIGS. 2, 3, and 4, openings BMA of black matrix BM are arranged at substantially equal intervals in the second direction. Alternatively, as illustrated in FIG. 5, the distance between first opening BMA1 and fifth opening BMA5 that are adjacent to each other in the second direction may be greater than the distance between first opening BMA1 and third opening BMA3 that are adjacent to each other in the second direction. In this case, second color filter CF2 may be disposed so as to overlap with at least a part in the region between first opening BMA1 and fifth opening BMA5 in planar view, and fourth sub-spacer 60B4 may be disposed between first opening BMA1 and fifth opening BMA5 so as to overlap with second color filter CF2 in planar view.

For example, in the case where thin film transistor substrate 230 includes a plurality of source lines extending in the first direction and a plurality of gate lines extending in the second direction, each source line traverses a region between two openings BMA adjacent to each other in the second direction, and each gate line traverses a region between two openings BMA adjacent to each other in the first direction. In the case where thin film transistor substrate 230 is electrically connected to each gate line and includes a gate lead line extending in the first direction, the gate lead line traverses the region between the two openings BMA adjacent to each other in the second direction. In this case, as compared with the region between the two openings BMA where only the source line is disposed, a larger area is required for the region between two openings BMA where the gate lead line and the source line are disposed. For this reason, in the example of FIG. 5, the gate lead line is preferably disposed in the region between first opening BMA1 and fifth opening BMA5 having a distance greater than that of the region between first opening BMA1 and third opening BMA3.

In the examples of FIGS. 3, 4, and 5, second color filter CF2 overlaps with each sub-spacer 60B in planar view. Alternatively, first color filter CF1 may overlap with each sub-spacer 60B in planar view, and third color filter CF3 may overlap with each sub-spacer 60B in planar view.

Figure 6:
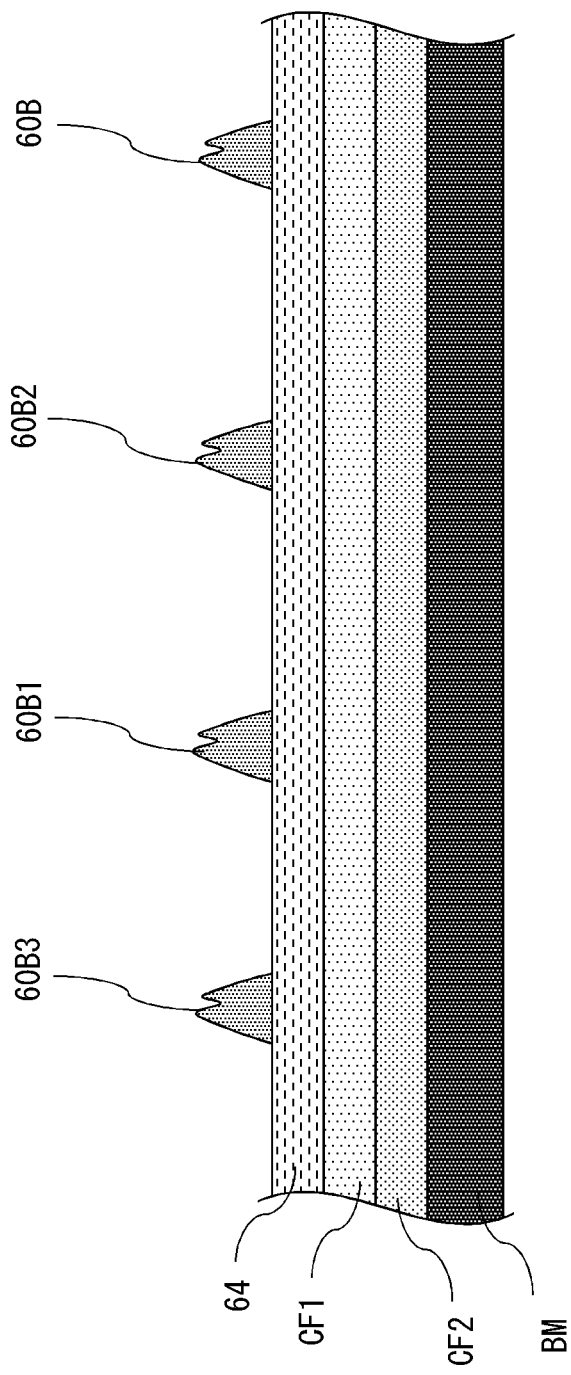
FIG. 6 is a sectional view of a display device according to another example in a first exemplary embodiment.

A laminated portion of the plurality of color filters CF may overlap with each sub-spacer 60B in planar view. For example, as illustrated in FIG. 6 that is a sectional view corresponding to line A-A in FIG. 3 and illustrates another example in the first exemplary embodiment, first color filter CF1 and second color filter CF2 may be disposed between the plurality of openings BMA adjacent to each other in the first direction (for example, between first opening BMA1 and second opening BMA2) while overlapping with each other, and each sub-spacers 60B (for example, first sub-spacers 60B1) may be disposed between the plurality of openings BMA adjacent to each other in the first direction while overlapping with the laminated portion of first color filter CF1 and second color filter CF2 in planar view.

Figure 7:
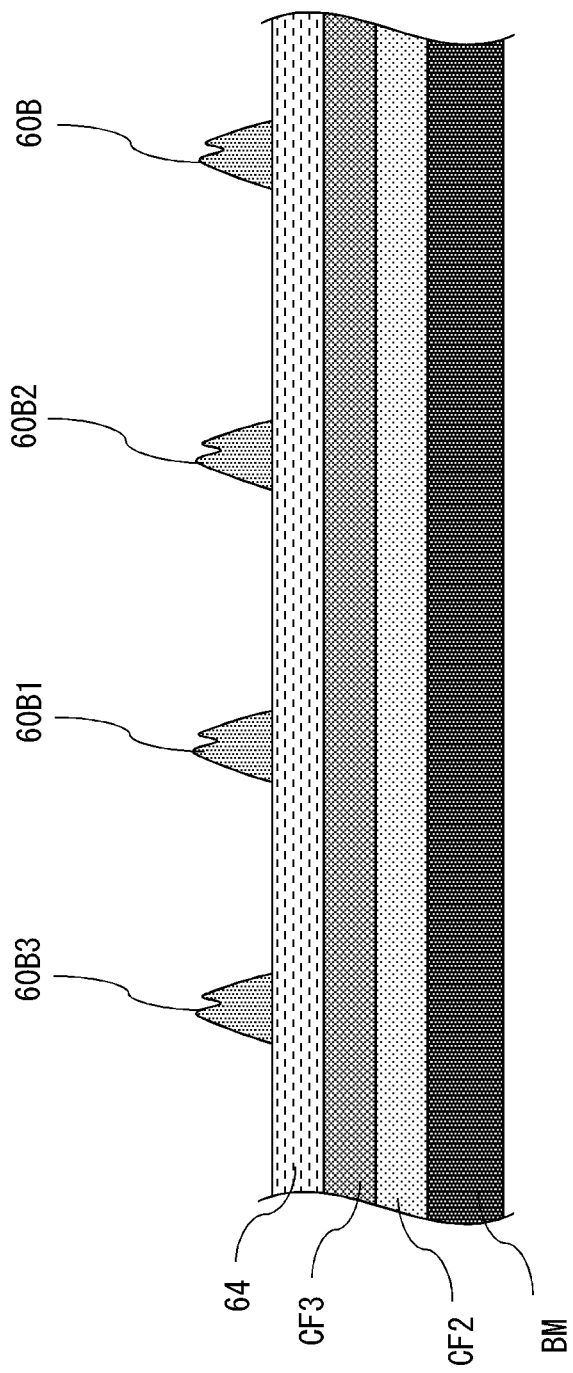
FIG. 7 is a sectional view of a display device according to another example in a first exemplary embodiment.

Similarly, as illustrated in FIG. 7, second color filter CF2 and third color filter CF3 may be disposed between the plurality of openings BMA adjacent to each other in the first direction (for example, between first opening BMA1 and second opening BMA2) while overlapping with each other, and each sub-spacers 60B (for example, first sub-spacers 60B1) may be disposed between the plurality of openings BMA adjacent to each other in the first direction while overlapping with the laminated portion of second color filter CF2 and third color filter CF3 in planar view.

In the above example, each sub-spacer 60B overlaps with second color filter CF2. Alternatively, color filter CF having a color different from that of second color filter CF2 may be disposed in a portion in which spacer 60 having the thickness identical to that of sub-spacer 60B is to function as main spacer 60A. For example, in the configurations of FIGS. 8 and 9, first color filter CF1 is disposed in a part in the region between fifth opening BMA5 and sixth opening BMA6 that are adjacent to each other in the first direction, and main spacer 60A having the thickness identical to that of sub-spacer 60B is disposed so as to overlap with first color filter CF1 in planar view. In the case where the thickness of first color filter CF1 on black matrix BM is larger than the thickness of second color filter CF2, even if main spacer 60A having a structure identical to that of sub-spacer 60B is used as main spacer 60A, the height from black matrix BM to the apex of spacer 60A is higher than the height from black matrix BM to the apex of sub-spacer 60B. Consequently, spacer 60 having the thickness identical to that of sub-spacer 60B can be made to function as main spacer 60A.

Figure 8:
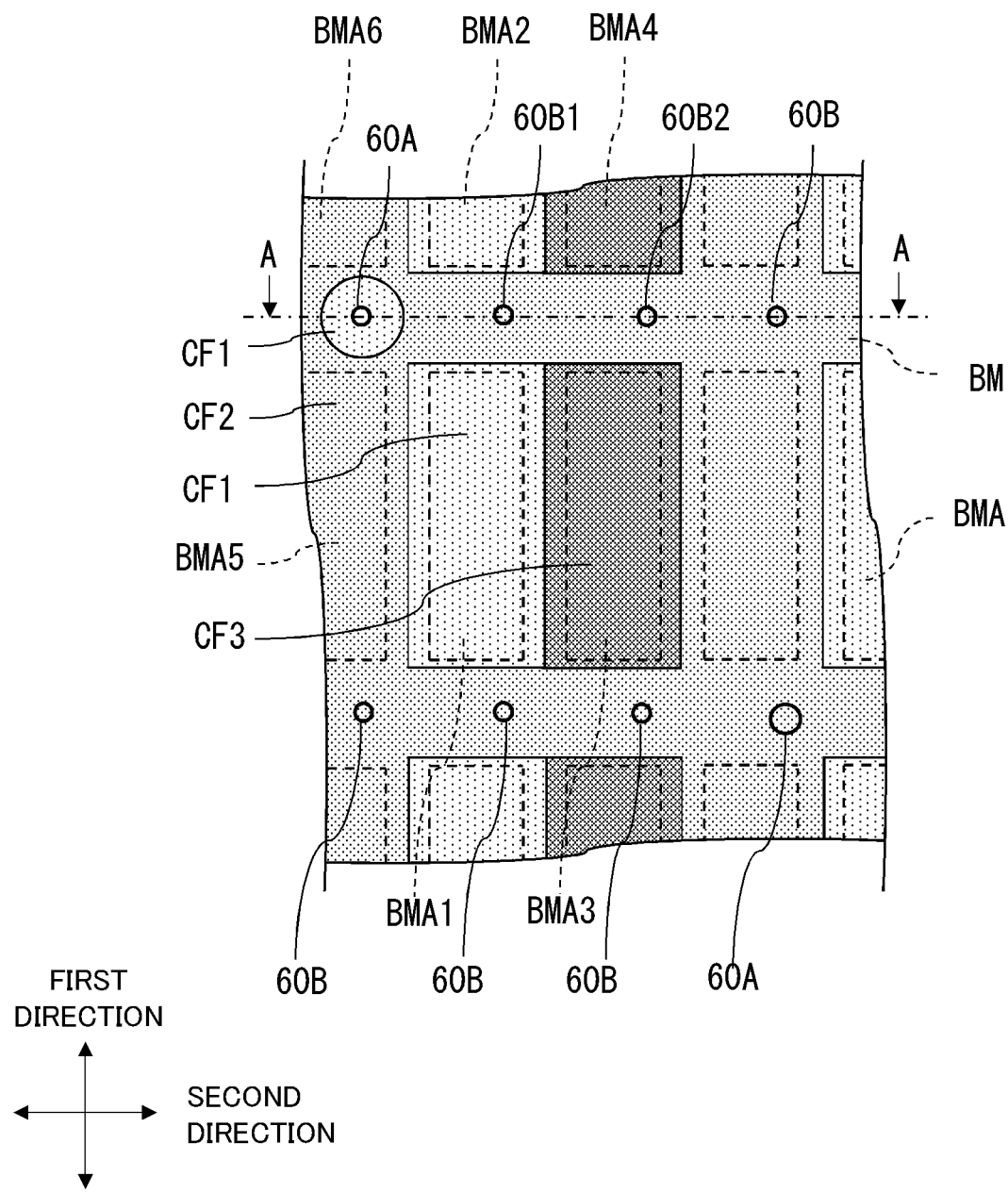
FIG. 8 is a plan view illustrating a configuration of a display device according to another example in a first exemplary embodiment in which color filter and spacer are disposed while overlapping with black matrix.
Figure 9:
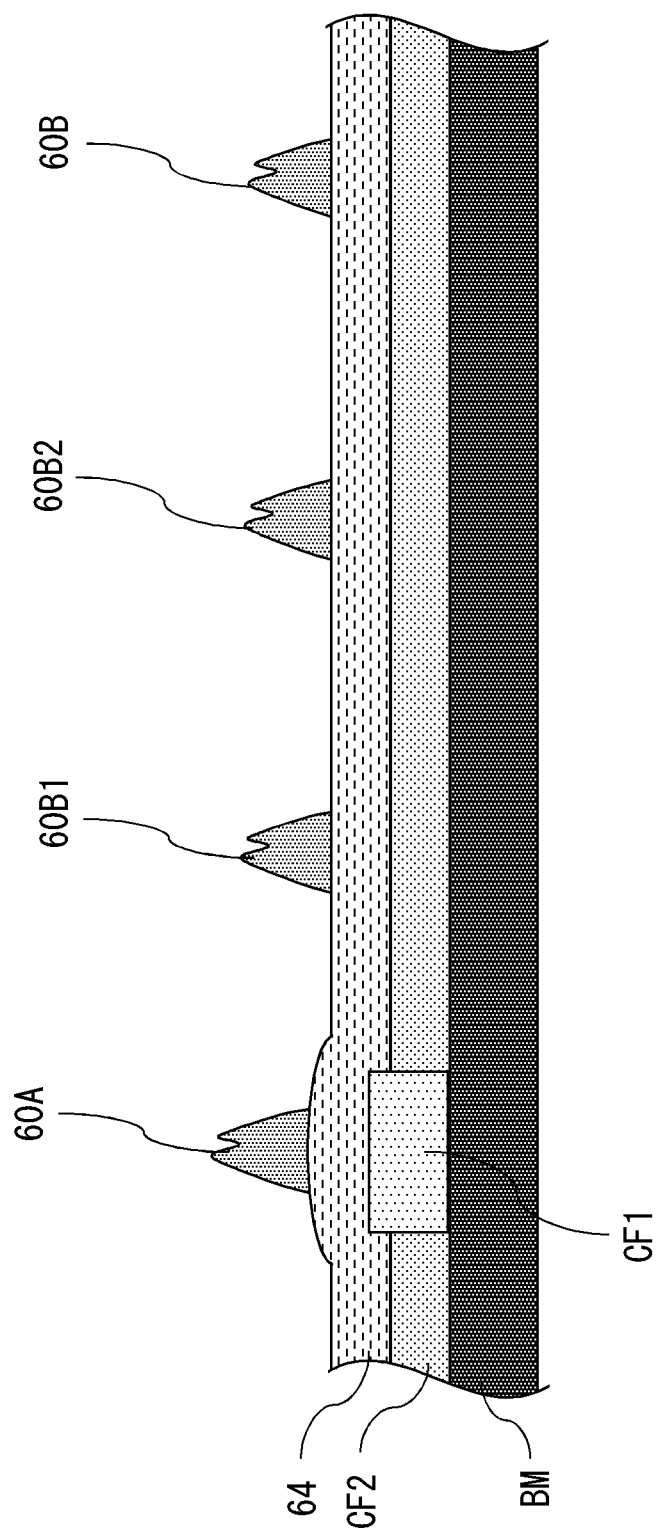
FIG. 9 is a sectional view of a display device according to another example in a first exemplary embodiment.

In the example of FIGS. 8 and 9, spacer 60 disposed between fifth opening BMA5 and sixth opening BMA6 functions as main spacer 60A. Alternatively, spacer 60 disposed at another position may function as main spacer 60A. In the example of FIGS. 8 and 9, main spacer 60A and first color filter CF1 overlap with each other in planar view. Alternatively, in the case where the thickness of third color filter CF3 on black matrix BM is larger than the thickness of second color filter CF2, main spacer 60A and third color filter CF3 may overlap with each other in planar view. Only color filter CF overlapping with main spacer 60A may be formed as a two-layer structure (for example, first color filter CF1 and second color filter CF2), and the height of main spacer 60A from black matrix BM may be set higher than the height of sub-spacer 60B.

Because a known configuration can be used in thin film transistor substrate 230 and liquid crystal layer 250 in FIG. 1, the description will be omitted.

Method for Manufacturing Display Device

A method for manufacturing the display device according to the first exemplary embodiment of the present disclosure will be described below with reference to the drawings. The method for manufacturing display device 100 of the first exemplary embodiment includes a step of preparing thin film transistor substrate 230 in FIG. 1 and a step of forming counter substrate 240 disposed to be opposed to thin film transistor substrate 230. Because a known manufacturing method can be used in the step of preparing thin film transistor substrate 230, the description will be omitted. Because the first exemplary embodiment is characterized by the step of forming counter substrate 240, the step of forming counter substrate 240 will be described below.

Figure 10:
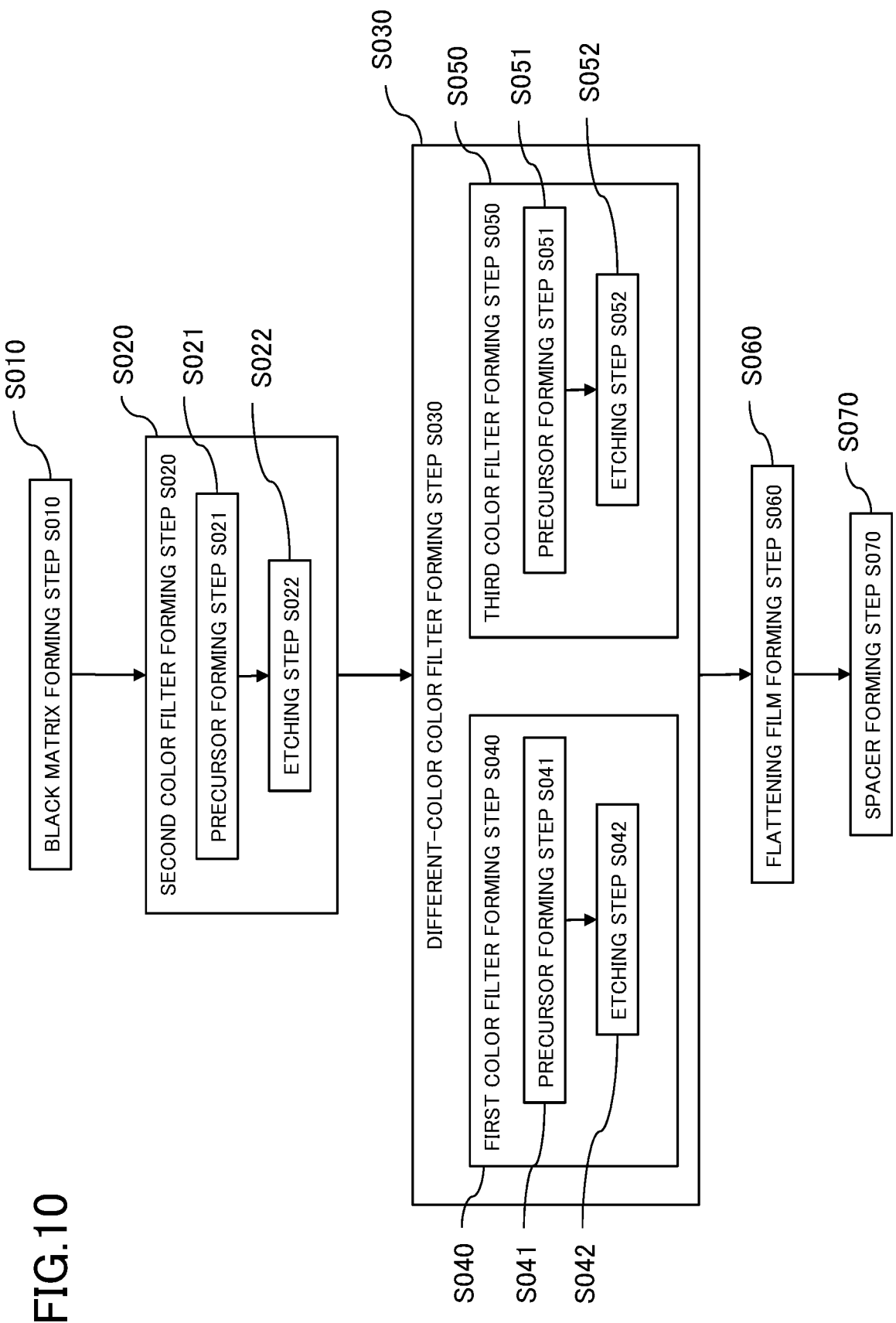
FIG. 10 is a flowchart illustrating a step of forming the counter substrate of a first exemplary embodiment.

FIG. 10 is a flowchart illustrating the step of forming the counter substrate of the first exemplary embodiment. As illustrated in FIG. 10, the step of forming the counter substrate of the first exemplary embodiment includes black matrix forming step S010, second color filter forming step S020, different-color color filter forming step S030, first color filter forming step S040, third color filter forming step S050, flattening film forming step S060, and spacer forming step S070.

Black Matrix Forming Step S010

In black matrix forming step S010, a resist made of a black resin is applied onto the entire first main surface of a transparent substrate such as a glass substrate included in the counter substrate, and black matrix BM in FIG. 2 is manufactured by a photolithography method accompanied with an exposure and development step. Any resist material may be used regardless of whether the resist material is a negative type or a positive type as long as the resist material forms a plurality of openings BMA in FIG. 2 through the exposure and development step.

In the first exemplary embodiment, as illustrated in FIG. 2, black matrix BM including first opening BMA1 and second opening BMA2 that are adjacent to each other in the first direction are formed on the first main surface of the transparent substrate. In the first exemplary embodiment, black matrix BM includes third opening BMA3 and fourth opening BMA4 that are adjacent to each other in the first direction as illustrated in FIG. 2.

Second Color Filter Forming Step S020

Subsequently, second color filter forming step S020 is performed. Second color filter forming step S020 includes precursor forming step S021 of forming a second color filter precursor of the second color (for example, blue) and first etching step S022 of removing a part of the second color filter precursor.

Figure 11:
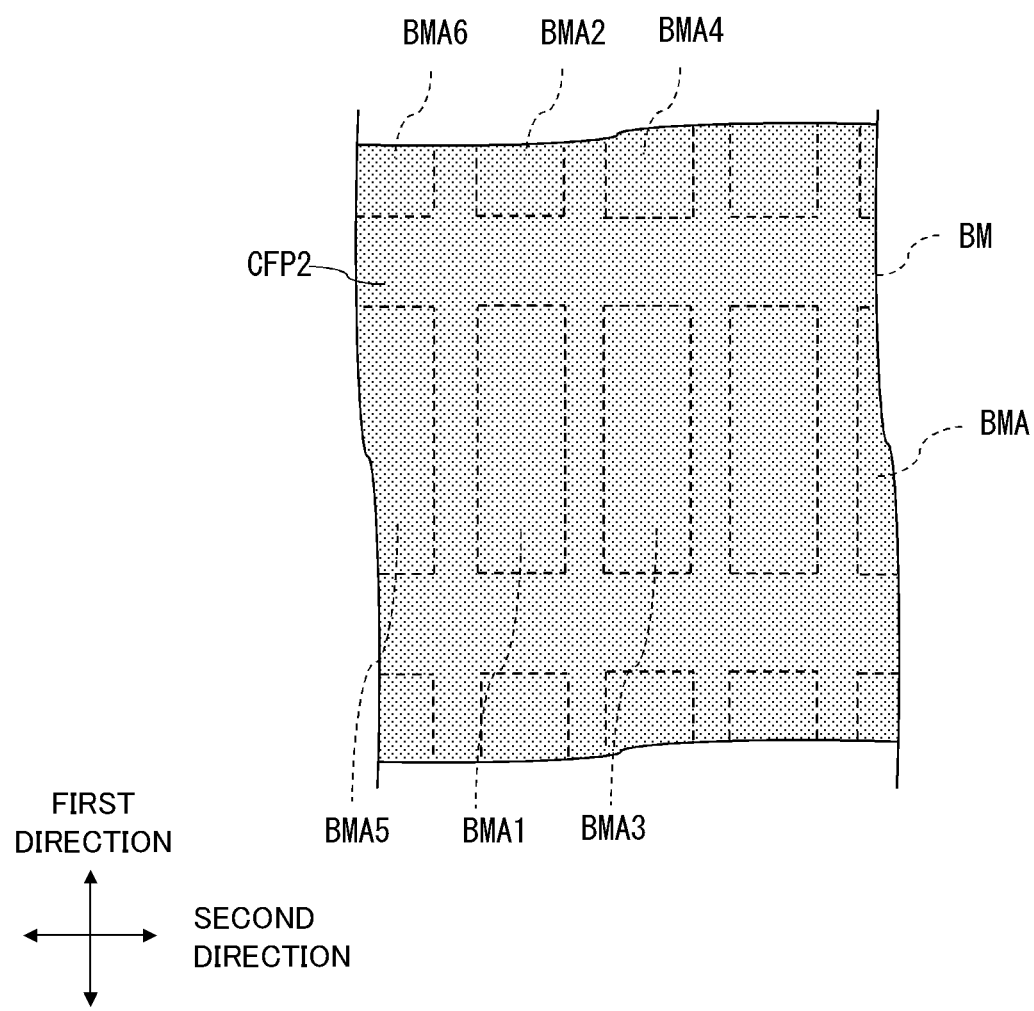
FIG. 11 is a plan view illustrated a manufacturing method of a display device of a first exemplary embodiment.

In precursor forming step S021, as illustrated in FIG. 11, a pigment-based second color resist is applied onto the entire first main surface side of the transparent substrate as second color filter precursor CFP2. In precursor forming step S021, the color resist of the second color covers the entire surface of black matrix BM including opening BMA.

Figure 12:
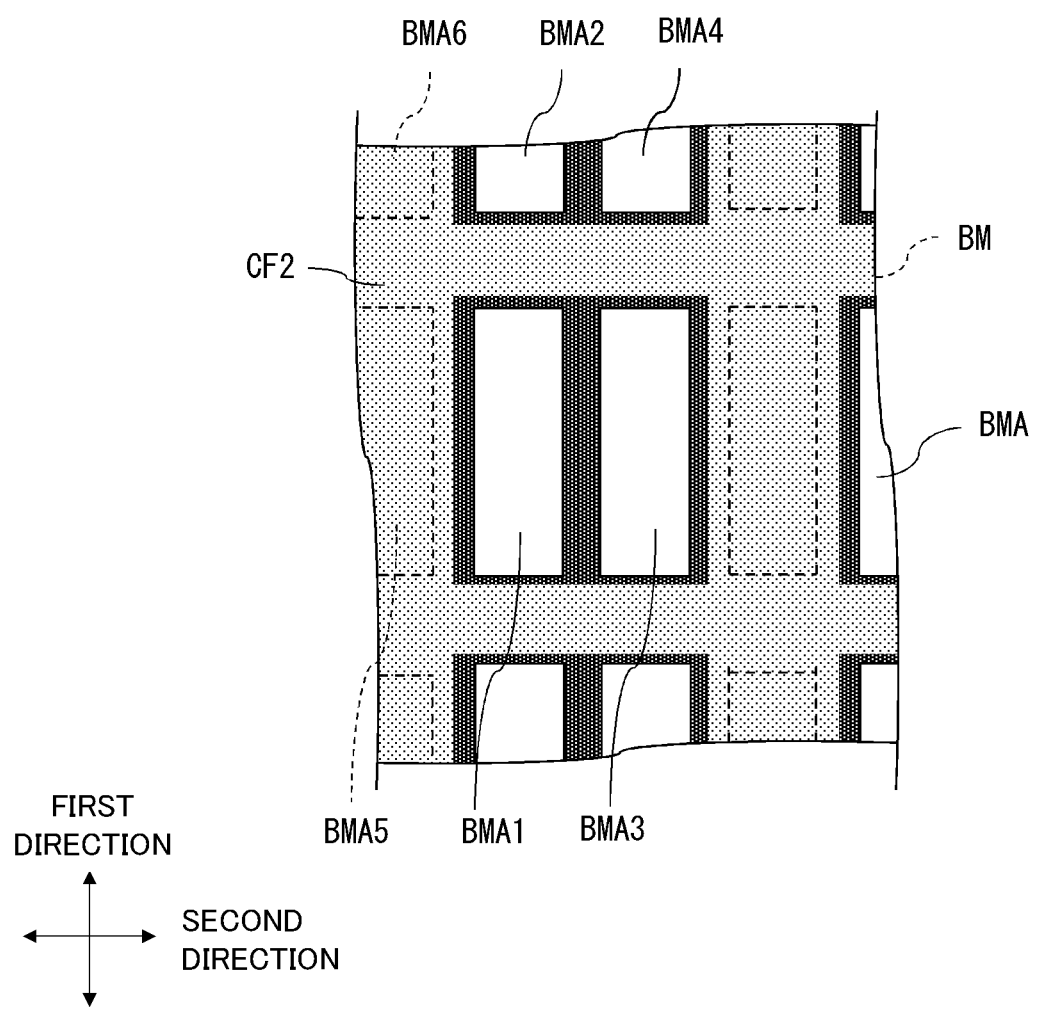
FIG. 12 is a plan view illustrated a manufacturing method of a display device of a first exemplary embodiment.

In first etching step S022, as illustrated in FIG. 12, by the photolithography method accompanied with the exposure and development step, second color filter precursor CFP2 is left in at least a part of a region between first opening BMA1 and second opening BMA2, and second color filter precursor CFP2 is removed from first opening BMA1 and second opening BMA2. In the first exemplary embodiment, second color filter precursor CFP2 is also removed from third opening BMA3 and fourth opening BMA4 that are formed in black matrix BM.

Second color filter CF2 as illustrated in FIG. 12 can be formed through precursor forming step S021 and first etching step S022. Any color resist material may be used regardless of whether the color resist material is a negative type or a positive type as long as the color resist material forms second color filter CF2 in FIG. 12 through the exposure and development step.

Different-Color Color Filter Forming Step S030

Subsequently, step S030 of forming a color filter having a color different from the second color on the entire first main surface side of the transparent substrate is performed. Different-color color filter forming step S030 includes a step of forming a color filter precursor having a color different from the second color on the entire first main surface side of the transparent substrate and a second etching step of etching the color filter precursor having the color different from the second color to leave the color filter precursor having the color different from the second color formed in first opening BMA1 and second opening BMA2.

In the first exemplary embodiment, step S030 of forming the color filter having the color different from the second color includes first color filter forming step S040 of forming the color filter having the first color (for example, red) and third color filter forming step S050 of forming the color filter having the third color (for example, green). First color filter forming step S040 and third color filter forming step S050 may be performed in any order.

First color filter forming step S040 includes precursor forming step S041 of forming the first color filter precursor and etching step S042 of removing a part of the first color filter precursor. Precursor forming step S041 of forming the first color filter precursor is a part of the step of forming the color filter precursor having the color different from the second color, and etching step S042 of removing a part of the first color filter precursor is a part of the second etching step.

Figure 13:
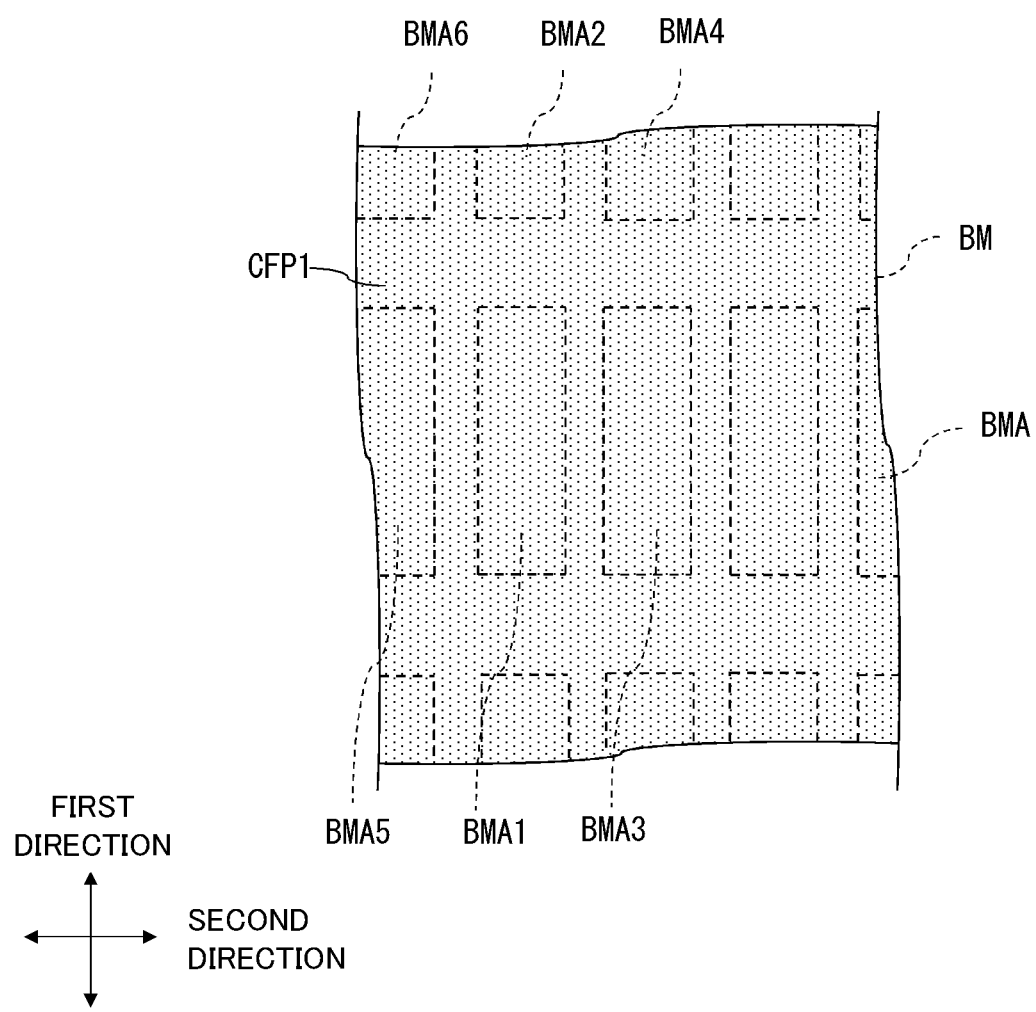
FIG. 13 is a plan view illustrated a manufacturing method of a display device of a first exemplary embodiment.

In precursor forming step S041, as illustrated in FIG. 13, a pigment-based first color resist is applied onto the entire first main surface side of the transparent substrate as first color filter precursor CFP1. In precursor forming step S041, the first color resist covers the entire surfaces of black matrix BM including opening BMA and second color filter CF2.

Figure 14:
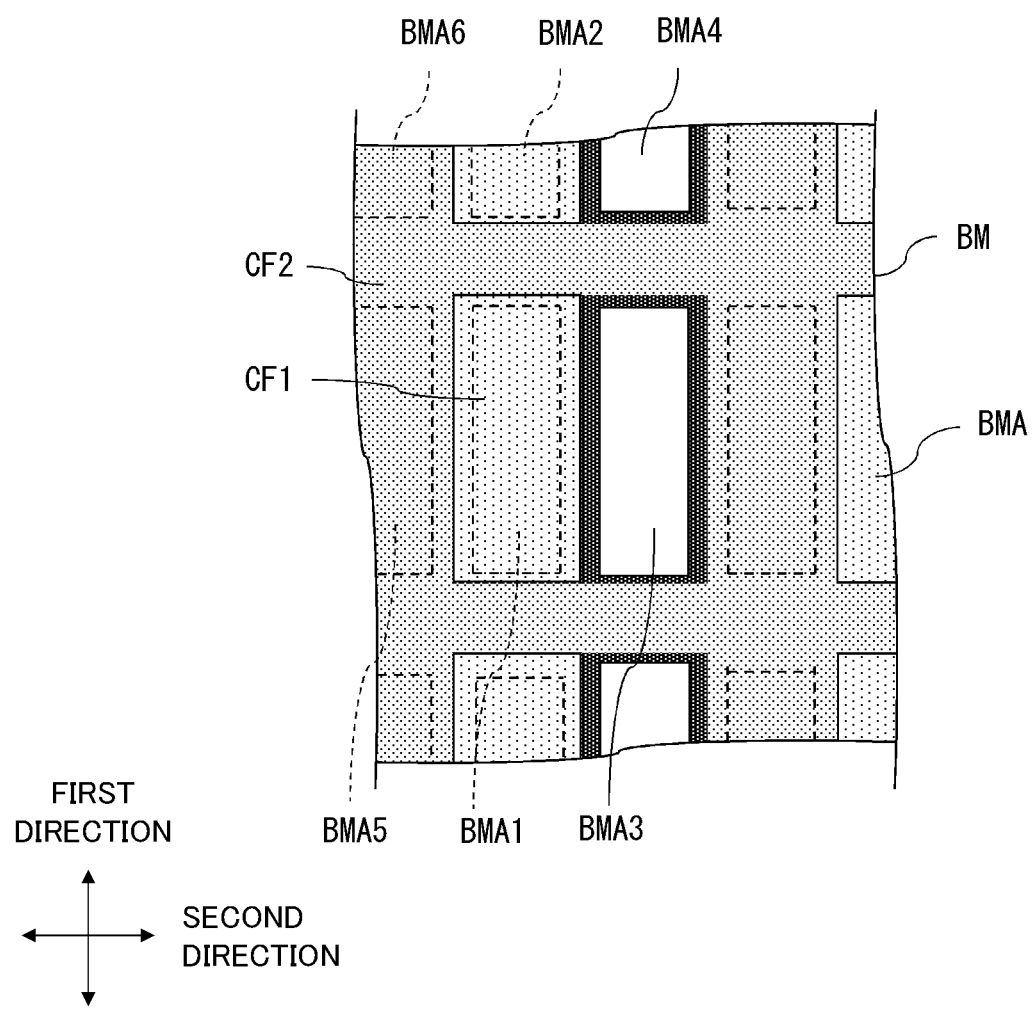
FIG. 14 is a plan view illustrated a manufacturing method of a display device of a first exemplary embodiment.

Subsequently, in etching step S042, by the photolithography method accompanied with the exposure and development step, first color filter precursor CFP1 is etched to leave first color filter precursor CFP1 formed in first opening BMA1 and second opening BMA2 as illustrated in FIG. 14. In other openings BMA, first color filter precursor CFP1 formed in opening BMA may be left when opening BMA corresponding to the pixel of the first color exists.

First color filter CF1 as illustrated in FIG. 14 can be formed through precursor forming step S041 and etching step S042. Any color resist material may be used regardless of whether the color resist material is a negative type or a positive type as long as the color resist material forms first color filter CF1 in FIG. 14 through the exposure and development step.

Third color filter forming step S050 includes precursor forming step S051 of forming the third color filter precursor and etching step S052 of removing a part of the third color filter precursor. Precursor forming step S051 of forming the third color filter precursor is a part of the step of forming the color filter precursor having the color different from the second color, and etching step S052 of removing a part of the third color filter precursor is a part of the second etching step.

Figure 15:
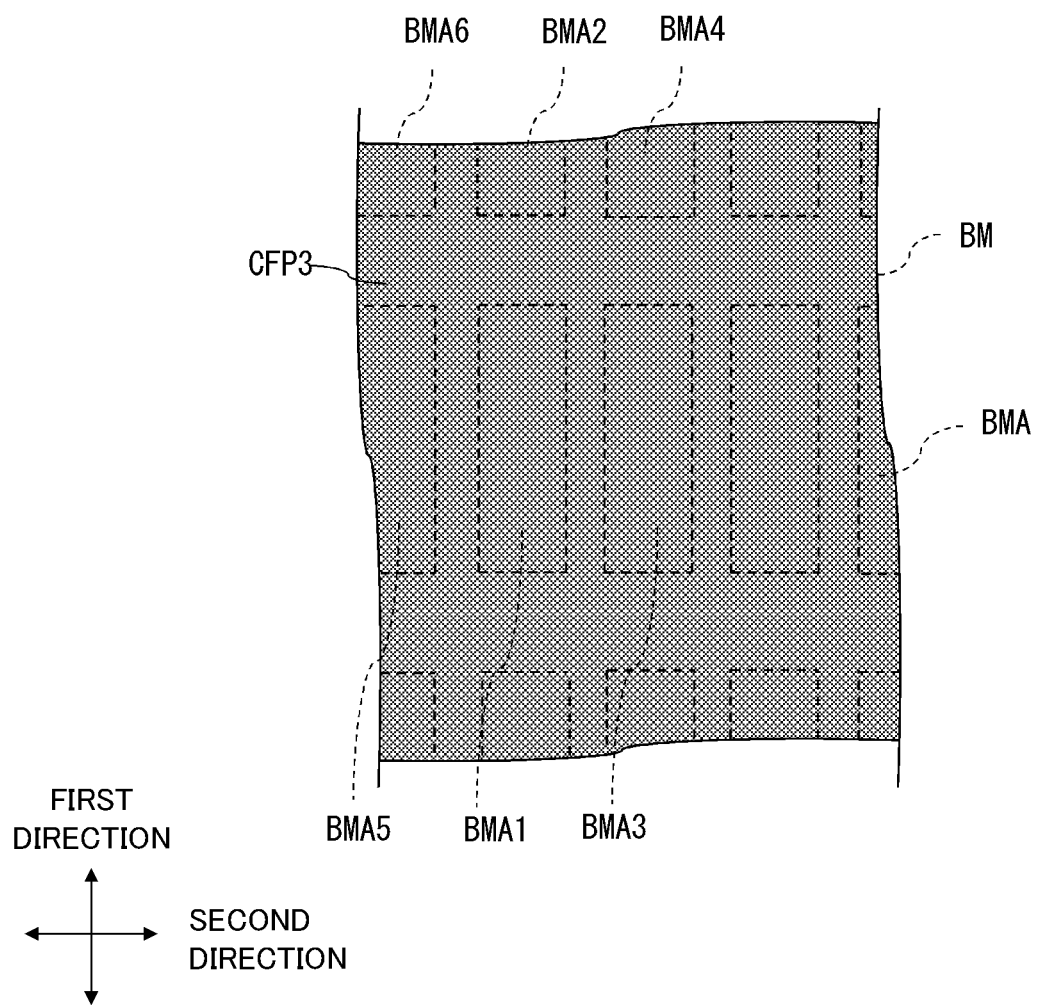
FIG. 15 is a plan view illustrated a manufacturing method of a display device of a first exemplary embodiment.

In precursor forming step S051, as illustrated in FIG. 15, a pigment-based third color resist is applied onto the entire first main surface side of the transparent substrate as third color filter precursor CFP3. In precursor forming step S051, the third color resist covers the entire surfaces of black matrix BM having opening BMA, second color filter CF2, and first color filter CF1.

Subsequently, in etching step S052, as illustrated in FIG. 3, by the photolithography method accompanied with the exposure and development step, third color filter precursor CFP3 is etched to leave third color filter precursor CFP3 formed in third opening BMA3 and fourth opening BMA4. In other openings BMA, third color filter precursor CFP3 formed in opening BMA may be left when opening BMA corresponding to the pixel of the third color exists.

Third color filter CF3 as illustrated in FIG. 3 can be formed through precursor forming step S051 and etching step S052. Any color resist material may be used regardless of whether the color resist material is a negative type or a positive type as long as the color resist material forms third color filter CF3 in FIG. 3 through the exposure and development step.

Second color filter CF2 can be formed on black matrix BM in which flatness is maintained by performing second color filter forming step S020 prior to different-color color filter forming step S030, so that second color filter CF2 can be formed with high accuracy. That is, as illustrated in FIG. 3, the position of second color filter CF2 formed between first opening BMA1 and second opening BMA2 and between third opening BMA3 and fourth opening BMA4 is prevented from being displaced in the first direction, which reduces a possibility that second color filter CF2 overlaps with the pixel region of the first color and the pixel region of the third color.

Flattening Film Forming Step S060

Subsequently, flattening film forming step S060 is performed. In flattening film forming step S060, flattening film 64 is formed on the entire first main surface side of the transparent substrate. A known manufacturing method can be used in flattening film forming step S060. Flattening film 64 covers the entire surfaces of second color filter CF2, first color filter CF1, and third color filter CF3.

Spacer Forming Step S070

Finally, spacer forming step S070 is performed. In spacer forming step S070, as illustrated in FIG. 3, first sub-spacer 60B1 is formed between first opening BMA1 and second opening BMA2 while overlapping with second color filter CF2 in planar view.

In the first exemplary embodiment, the plurality of sub-spacers 60B are formed so as to overlap with second color filter CF2 in planar view. Specifically, second sub-spacer 60B2 is formed between third opening BMA3 and fourth opening BMA4 while overlapping with second color filter CF2 in planar view. Third sub-spacer 60B3 is formed between fifth opening BMA5 and sixth opening BMA6 while overlapping with second color filter CF2 in planar view. Each sub-spacer 60B can be formed by the photolithography method accompanied with the exposure and development step.

By adopting the above manufacturing method, the generation of the variation in tolerance to the external force from the direction orthogonal to the display surface can be prevented in the display surface of the display panel. That is, as illustrated in FIG. 4 that is a sectional view taken along line A-A in FIG. 3, first sub-spacer 60B1, second sub-spacer 60B2, and third sub-spacer 60B3 are disposed so as to overlap with second color filter CF2 in planar view, so that a distance between each sub-spacer 60B and thin film transistor substrate 230 can be equalized. As a result, the variation in tolerance to the external force from the direction orthogonal to the display surface can be prevented in the display surface of the display panel.

Second Exemplary Embodiment

Figure 16:
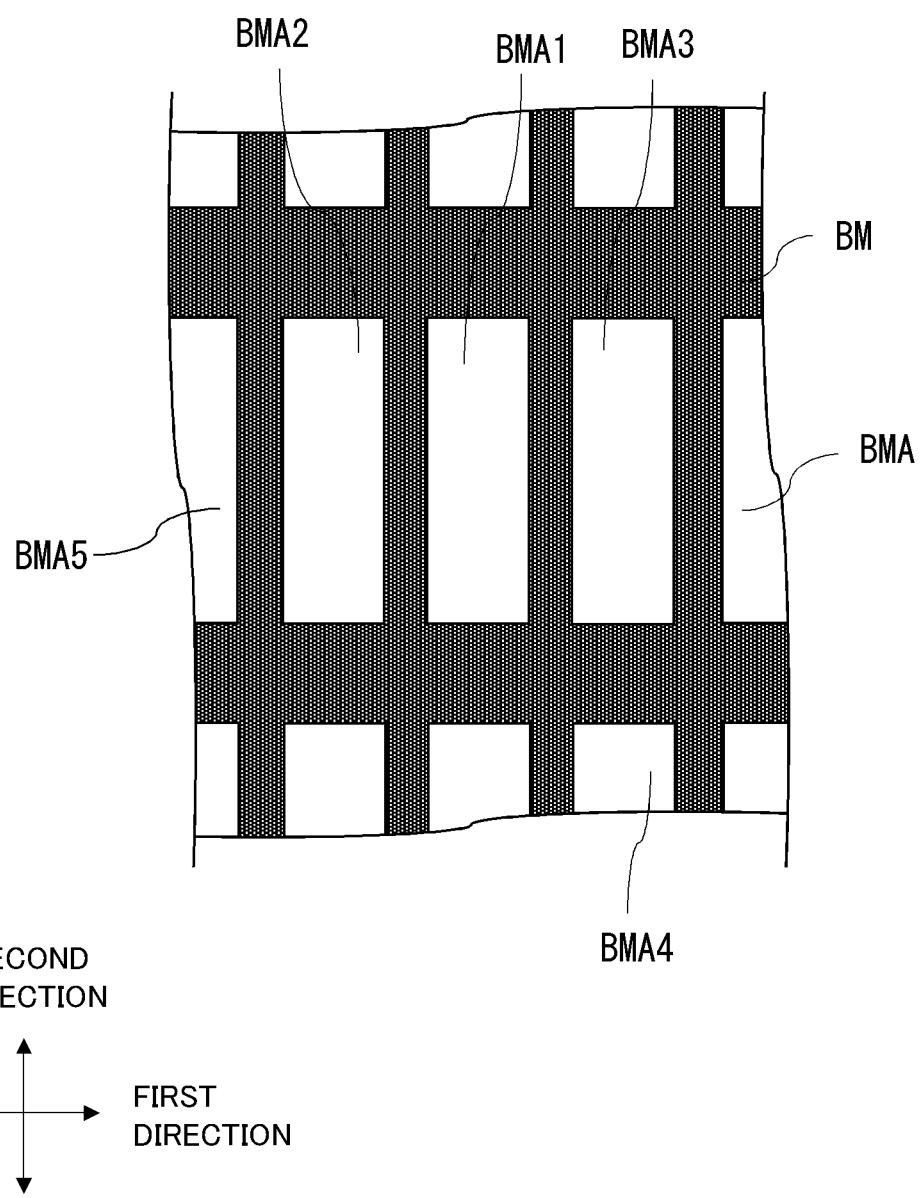
FIG. 16 is a plan view illustrating black matrix included in counter substrate in a second exemplary embodiment.

Display device 100 according to a second exemplary embodiment of the present disclosure will be described below with reference to the drawings. FIG. 16 is a plan view illustrating black matrix BM included in counter substrate 240 of the second exemplary embodiment. As illustrated in FIG. 16, black matrix BM includes a plurality of openings BMA arranged in the first direction and the second direction intersecting the first direction. One opening BMA corresponds to one pixel region.

In the second exemplary embodiment, black matrix BM includes first opening BMA1, second opening BMA2 adjacent to first opening BMA1 in the first direction, and third opening BMA3 that is adjacent to first opening BMA1 in the first direction and is disposed on the side opposite to second opening BMA2 with respect to first opening BMA1. Black matrix BM also includes fifth opening BMA5 that is adjacent to second opening BMA2 in the first direction and is disposed on the side opposite to first opening BMA1 with respect to second opening BMA2.

Figure 17:
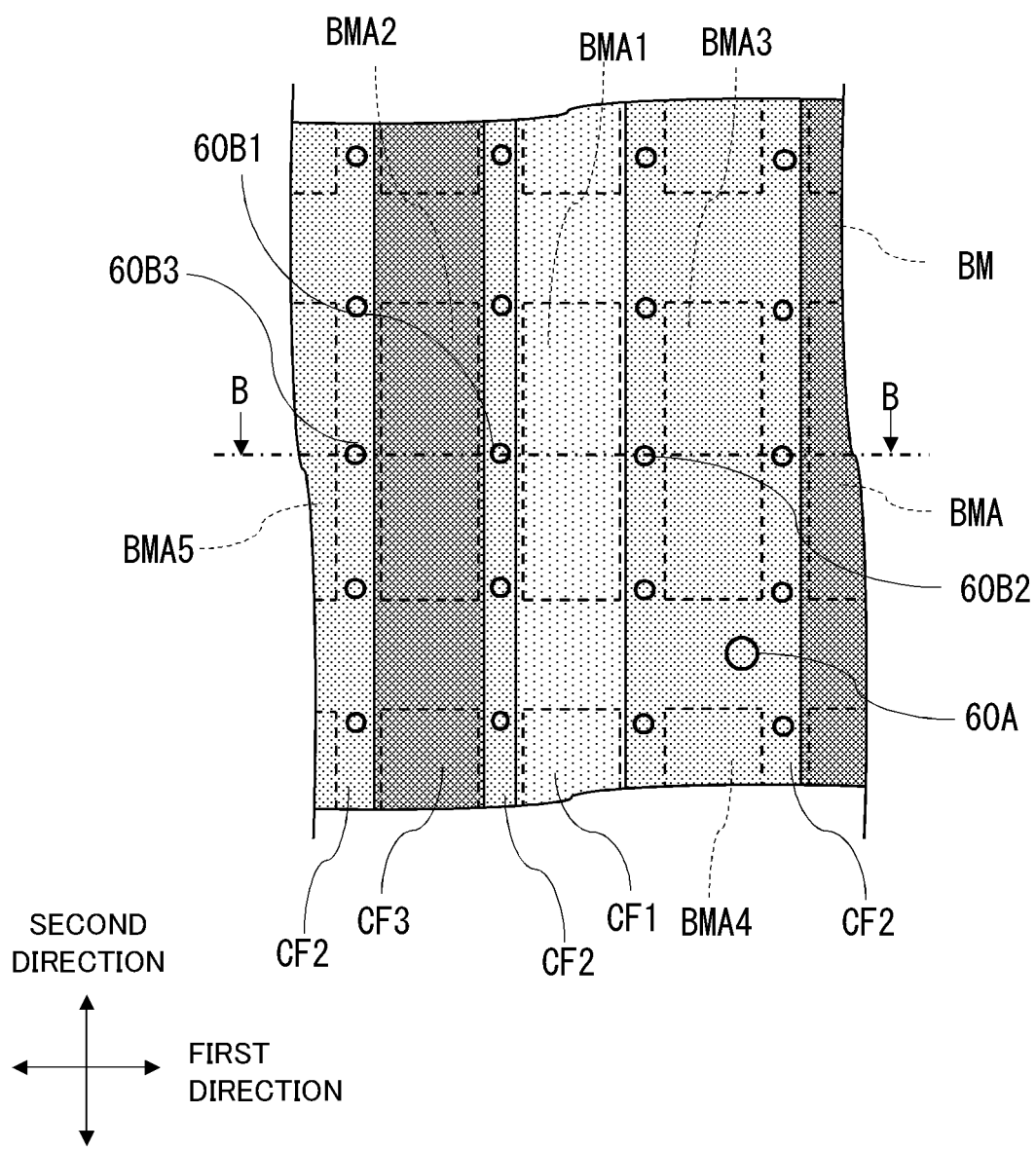
FIG. 17 is a plan view illustrating a configuration of a display device according to a second exemplary embodiment in which color filter and spacer are disposed while overlapping with black matrix.

Counter substrate 240 includes color filter CF that is disposed while overlapping with black matrix BM. FIG. 17 is a plan view illustrating a configuration in which color filter CF and spacer 60 are disposed while overlapping with black matrix BM. As illustrated in FIG. 17, color filter CF is disposed while overlapping with each opening BMA of black matrix BM, and the display color in each pixel region can be varied according to the color of color filter CF.

In the second exemplary embodiment, first color filter CF1 having the first color (for example, red) is disposed while overlapping with first opening BMA1 in planar view. Third color filter CF3 having the third color (for example, green) is disposed while overlapping with second opening BMA2 in planar view. Second color filter CF2 having the second color (for example, blue) is disposed while overlapping with third opening BMA3 and fifth opening BMA5 in planar view. In the second exemplary embodiment, second color filter CF2 is disposed while overlapping with at least a part of the region between first opening BMA1 and second opening BMA2 in planar view. First sub-spacer 60B1 is disposed between first opening BMA1 and second opening BMA2 so as to overlap with second color filter CF2 in planar view.

Second color filter CF2 is disposed so as to overlap with at least a part of the region between first opening BMA1 and third opening BMA3 in planar view, and second sub-spacer 60B2 is disposed between first opening BMA1 and third opening BMA3 so as to overlap with second color filter CF2 in planar view.

In the second exemplary embodiment, second color filter CF2 is disposed while overlapping with at least a part of the region between fifth opening BMA5 and second opening BMA2 in planar view. Third sub-spacer 60B3 is disposed between fifth opening BMA5 and second opening BMA2 so as to overlap with second color filter CF2 in planar view.

Figure 18:
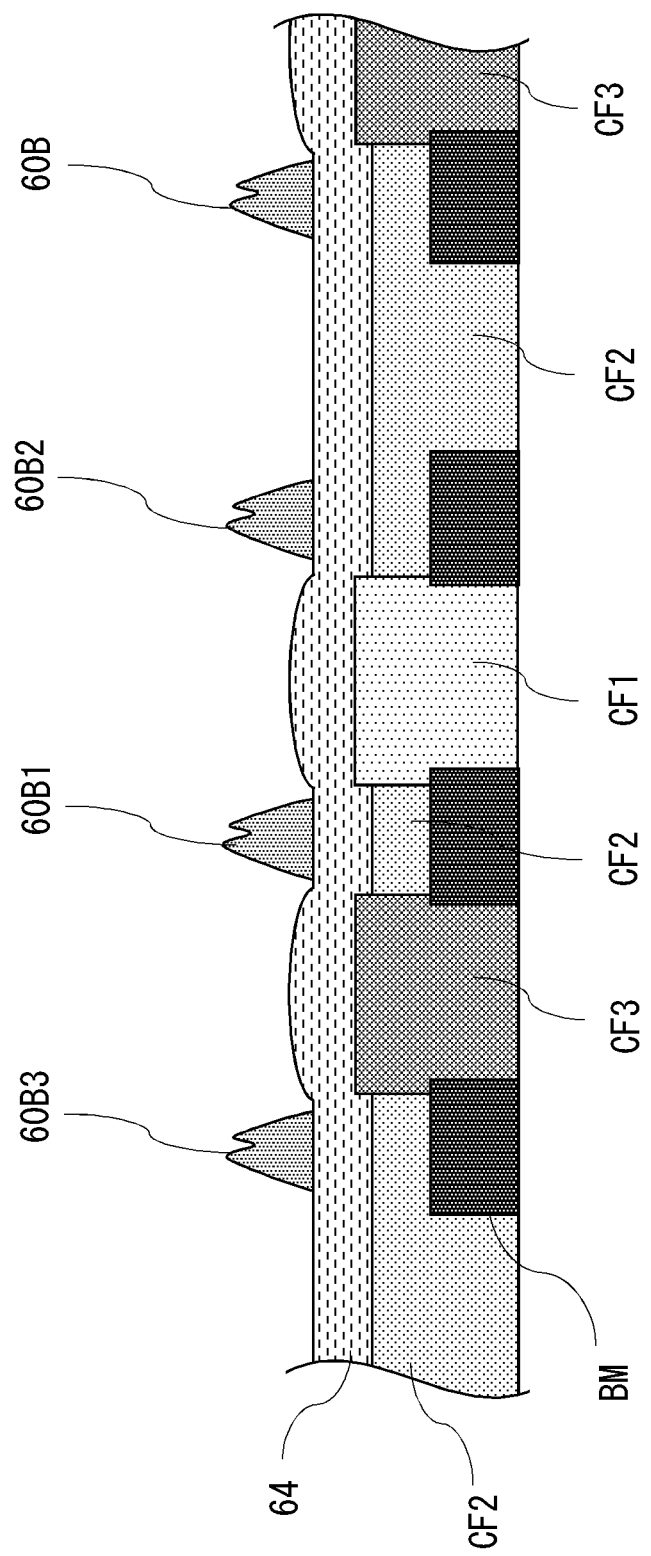
FIG. 18 is a sectional view taken along line B-B in FIG. 17.

With the above configuration, generation of a variation in tolerance to the external force from the direction orthogonal to the display surface can be prevented in the display surface of the display panel. That is, as illustrated in FIG. 18 that is a sectional view taken along line B-B in FIG. 17, first sub-spacer 60B1, second sub-spacer 60B2, and third sub-spacer 60B3 are disposed so as to overlap with second color filter CF2 in planar view, so that the distance between each sub-spacer 60B and thin film transistor substrate 230 can be equalized. As a result, the variation in tolerance to the external force from the direction orthogonal to the display surface can be prevented in the display surface of the display panel. As illustrated in FIG. 18, flattening film 64 may be interposed between color filter CF and each sub-spacer 60B.

Figure 19:
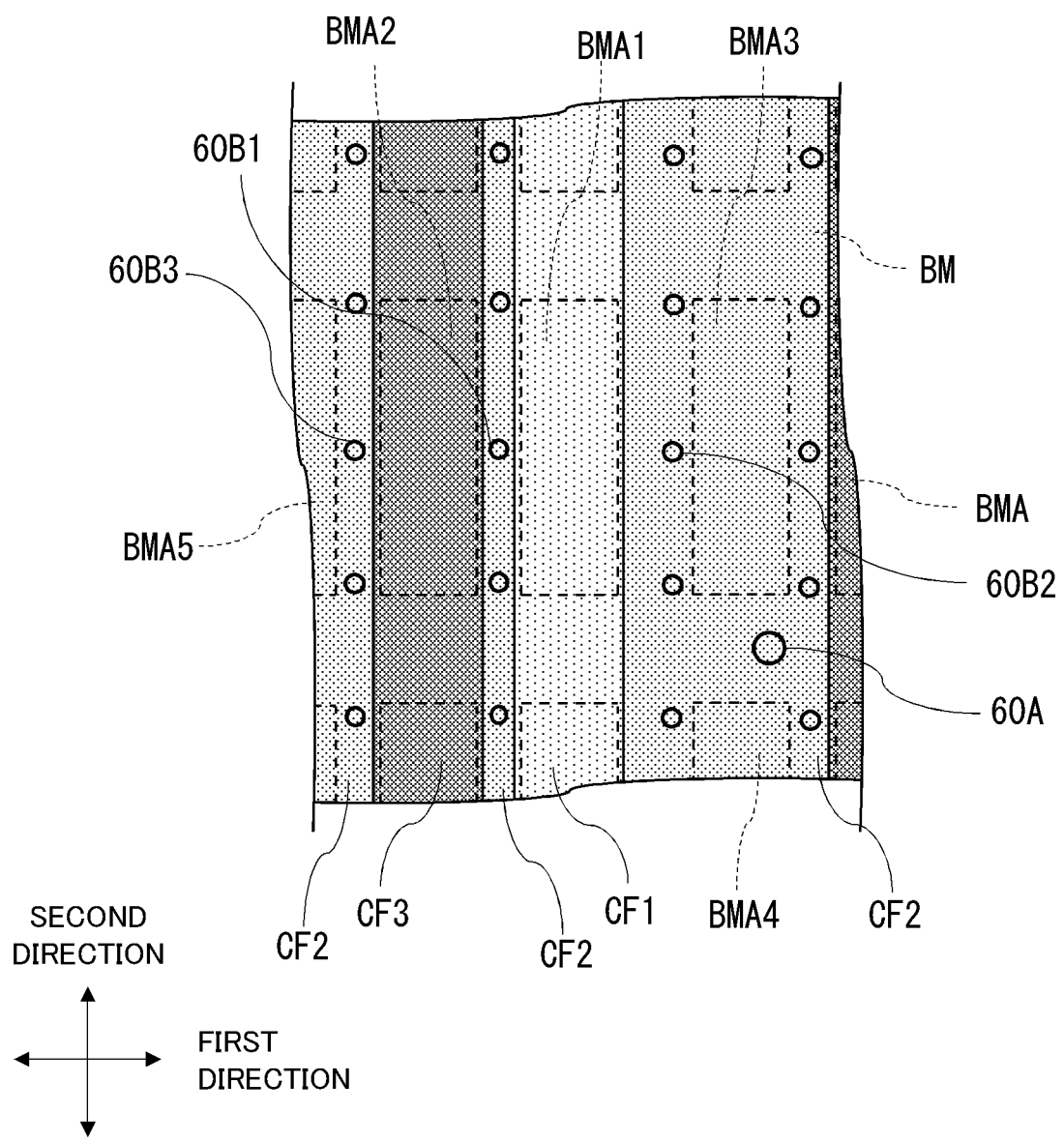
FIG. 19 is a plan view illustrating a configuration of a display device according to another example in a second exemplary embodiment in which color filter and spacer are disposed while overlapping with black matrix.

In the examples of FIGS. 16, 17, and 18, openings BMA of black matrix BM are arranged at substantially equal intervals in the first direction. Alternatively, as illustrated in FIG. 19, the distance between first opening BMA1 and third opening BMA3 that are adjacent to each other in the first direction may be greater than the distance between first opening BMA1 and second opening BMA2 that are adjacent to each other in the first direction.

For example, in the case where thin film transistor substrate 230 includes the plurality of source lines extending in the second direction and the plurality of gate lines extending in the first direction, each source line traverses the region between two openings BMA adjacent to each other in the first direction, and each gate line traverses the region between two openings BMA adjacent to each other in the second direction. In the case where thin film transistor substrate 230 is electrically connected to each gate line and includes the gate lead line extending in the second direction, the gate lead line traverses the region between the two openings BMA adjacent to each other in the first direction. In this case, as compared with the region between the two openings BMA where only the source line is disposed, a larger area is required for the region between two openings BMA where the gate lead line and the source line are disposed. For this reason, in the example of FIG. 19, the gate lead line is preferably disposed in the region between first opening BMA1 and third opening BMA3 having a distance greater than that of the region between first opening BMA1 and second opening BMA2.

In the examples of FIGS. 16, 17, and 18, second color filter CF2 overlaps with each sub-spacer 60B in planar view. Alternatively, first color filter CF1 may overlap with each sub-spacer 60B in planar view, and third color filter CF3 may overlap with each sub-spacer 60B in planar view.

Figure 20:
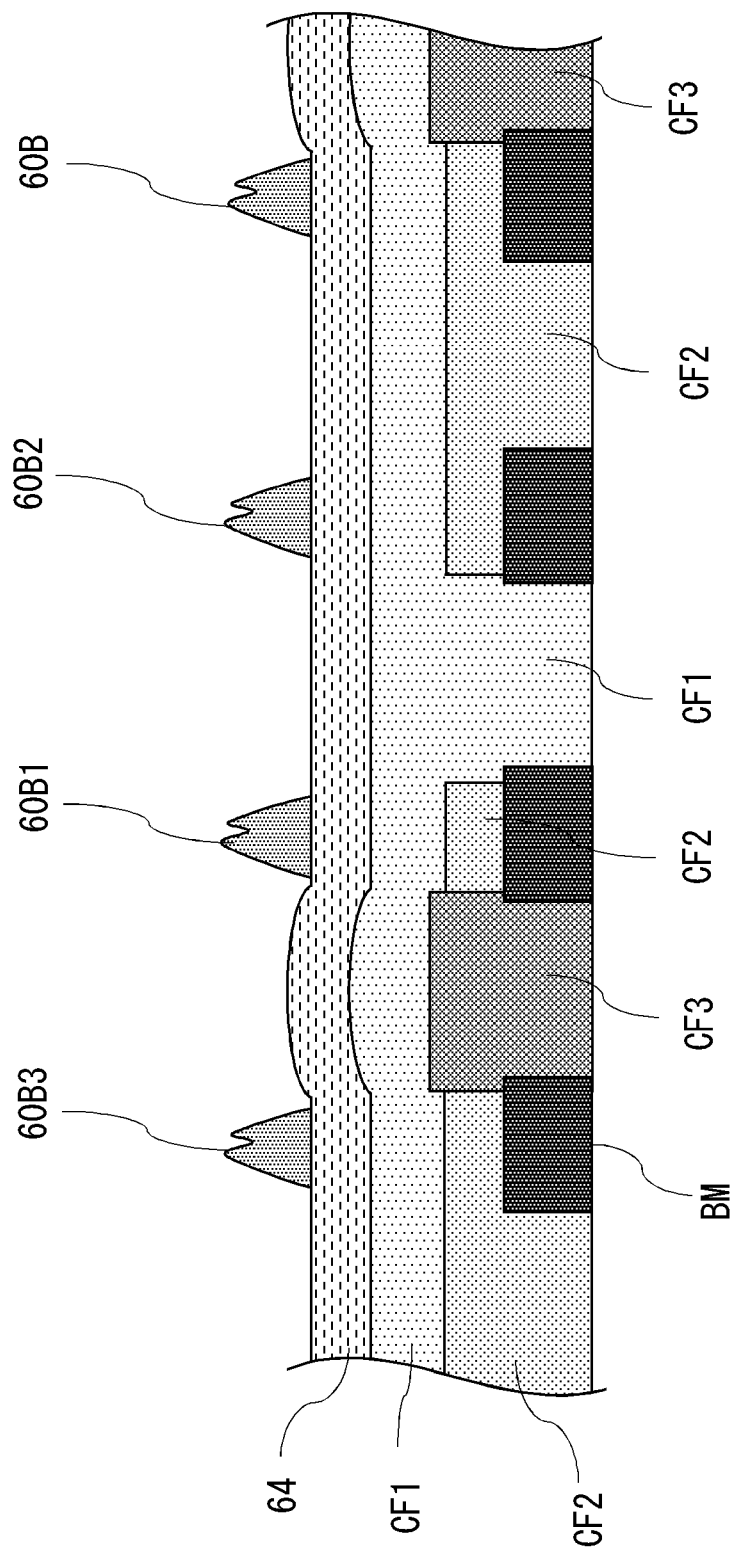
FIG. 20 is a sectional view of a display device according to another example in a second exemplary embodiment.

A laminated portion of the plurality of color filters CF may overlap with each sub-spacer 60B in planar view. For example, as illustrated in FIG. 20 that is a sectional view corresponding to line B-B in FIG. 17 and illustrates another example in the second exemplary embodiment, first color filter CF1 and second color filter CF2 may be disposed between the plurality of openings BMA adjacent to each other in the first direction (for example, between first opening BMA1 and second opening BMA2) while overlapping with each other, and each sub-spacers 60B (for example, first sub-spacers 60B1) may be disposed between the plurality of openings BMA adjacent to each other in the first direction while overlapping with the laminated portion of first color filter CF1 and second color filter CF2 in planar view.

Figure 21:
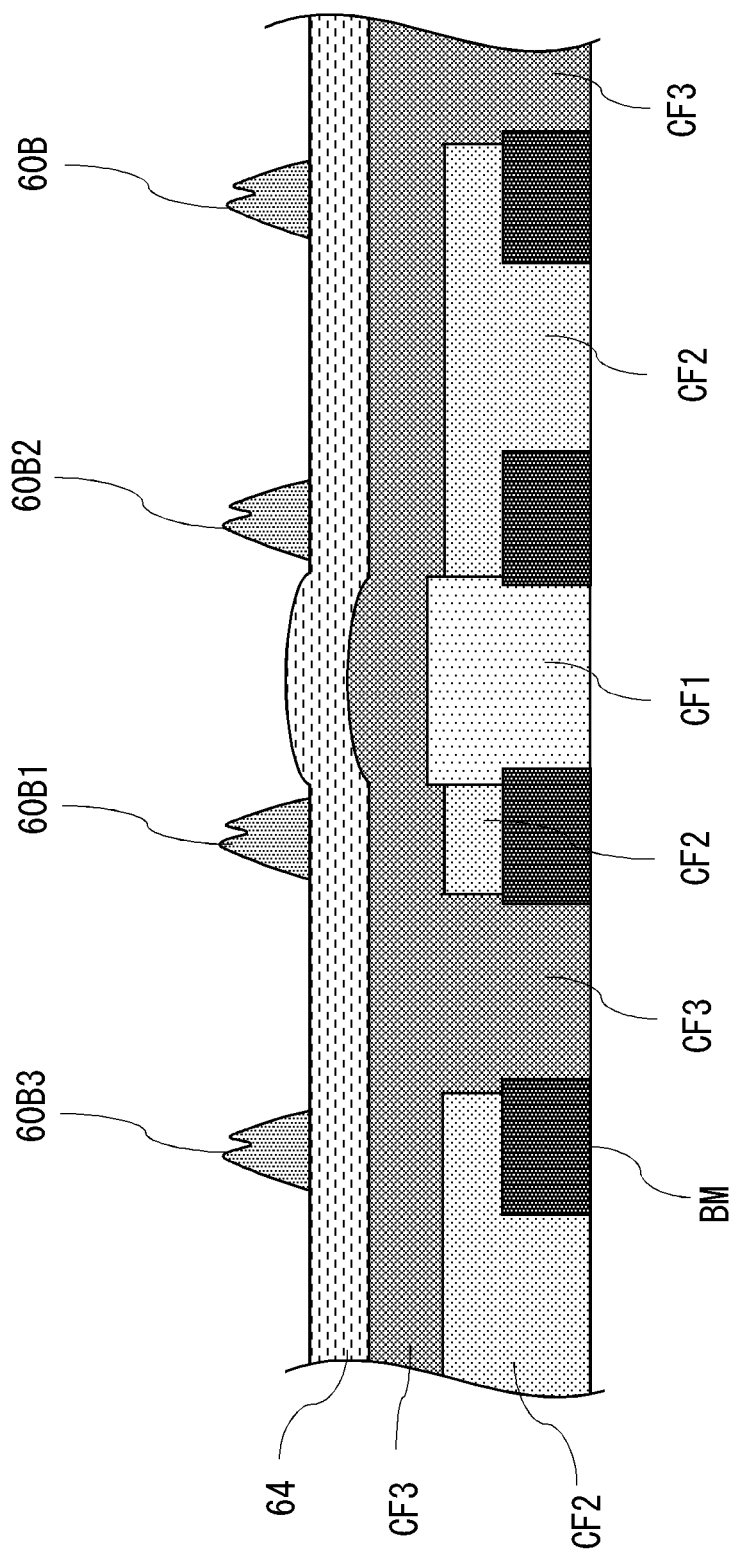
FIG. 21 is a sectional view of a display device according to another example in a second exemplary embodiment.

Similarly, as illustrated in FIG. 21, second color filter CF2 and third color filter CF3 may be disposed between the plurality of openings BMA adjacent to each other in the first direction (for example, between first opening BMA1 and third opening BMA3) while overlapping with each other, and each sub-spacers 60B (for example, second sub-spacers 60B2) may be disposed between the plurality of openings BMA adjacent to each other in the first direction while overlapping with the laminated portion of second color filter CF2 and third color filter CF3 in planar view.

In the above example, each sub-spacer 60B overlaps with second color filter CF2. Alternatively, color filter CF having a color different from that of second color filter CF2 may be disposed in a portion in which spacer 60 having the thickness identical to that of sub-spacer 60B is to function as main spacer 60A. For example, in a configuration of FIG. 22, black matrix BM further includes fourth opening BMA4 adjacent to third opening BMA3 in the second direction intersecting the first direction, and first color filter CF1 is disposed in a part of the region between third opening BMA3 and fourth opening BMA4. Main spacer 60A having the thickness identical to that of sub-spacer 60B is disposed between third opening BMA3 and fourth opening BMA4 so as to overlap with first color filter CF1 in planar view. In the case where the thickness of first color filter CF1 on black matrix BM is larger than the thickness of second color filter CF2, even if main spacer 60A having a structure identical to that of sub-spacer 60B is used as main spacer 60A, the height from black matrix BM to the apex of spacer 60A is higher than the height from black matrix BM to the apex of sub-spacer 60B. Consequently, spacer 60 having the thickness identical to that of sub-spacer 60B can be made to function as main spacer 60A.

Figure 22:
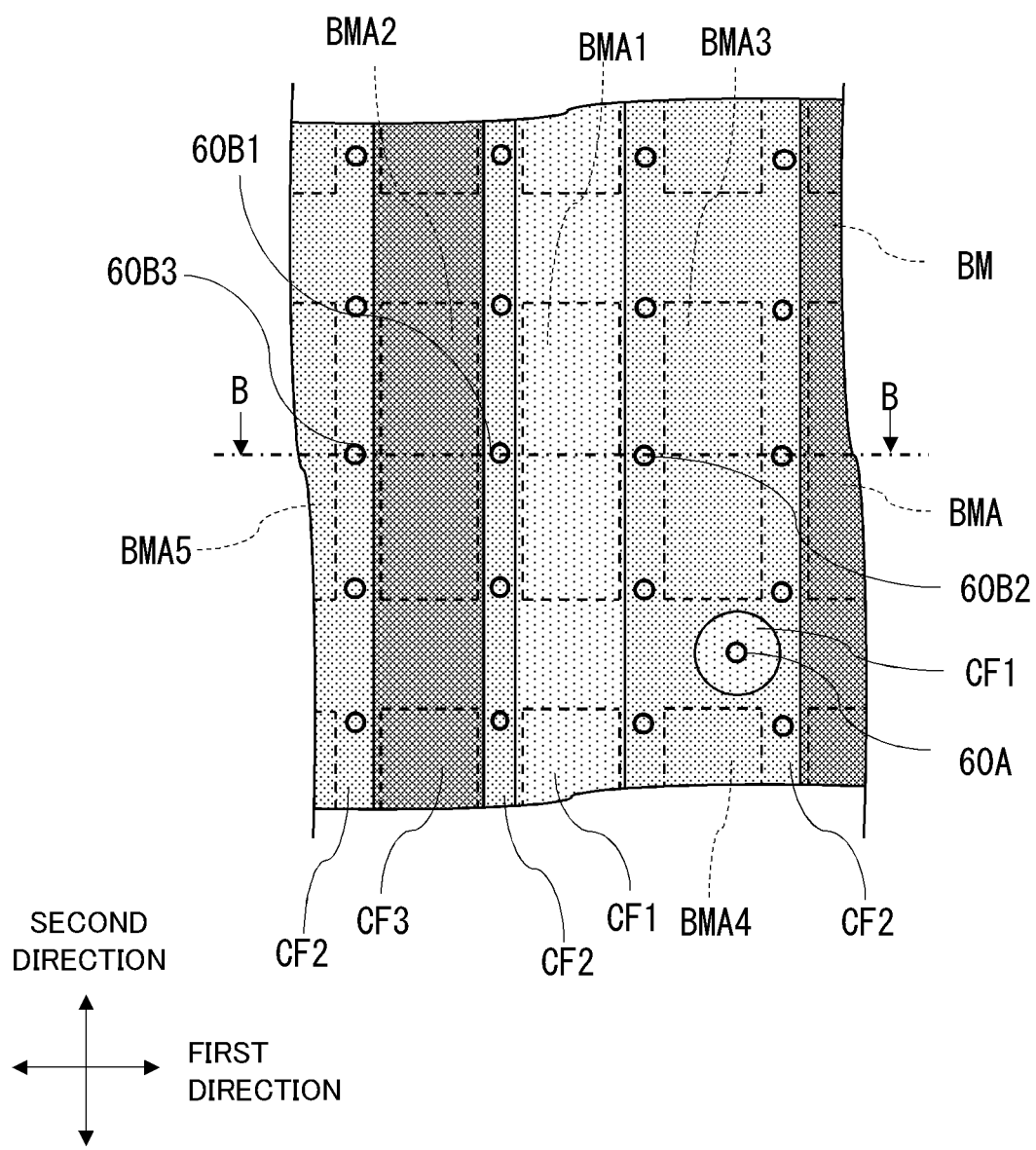
FIG. 22 is a plan view illustrating a configuration of a display device according to another example in a second exemplary embodiment in which color filter and spacer are disposed while overlapping with black matrix.

In the example of FIG. 22, spacer 60 disposed between third opening BMA3 and fourth opening BMA4 functions as main spacer 60A. Alternatively, spacer 60 disposed at another position may function as main spacer 60A. In the example of FIG. 22, main spacer 60A and first color filter CF1 overlap with each other in planar view. Alternatively, in the case where the thickness of third color filter CF3 on black matrix BM is larger than the thickness of second color filter CF2, main spacer 60A and third color filter CF3 may overlap with each other in planar view. Only color filter CF overlapping with main spacer 60A may be formed as a two-layer structure (for example, first color filter CF1 and second color filter CF2), and the height of main spacer 60A from black matrix BM may be set higher than the height of sub-spacer 60B.

Method for Manufacturing Display Device

A method for manufacturing the display device of the second exemplary embodiment of the present disclosure will be described below with reference to the drawings. The method for manufacturing display device 100 of the second exemplary embodiment includes a step of preparing thin film transistor substrate 230 in FIG. 1 and a step of forming counter substrate 240 disposed to be opposed to thin film transistor substrate 230. Because a known manufacturing method can be used in the step of preparing thin film transistor substrate 230, the description will be omitted. Because the second exemplary embodiment is characterized by the step of forming counter substrate 240, the step of forming counter substrate 240 will be described below.

Figure 23:
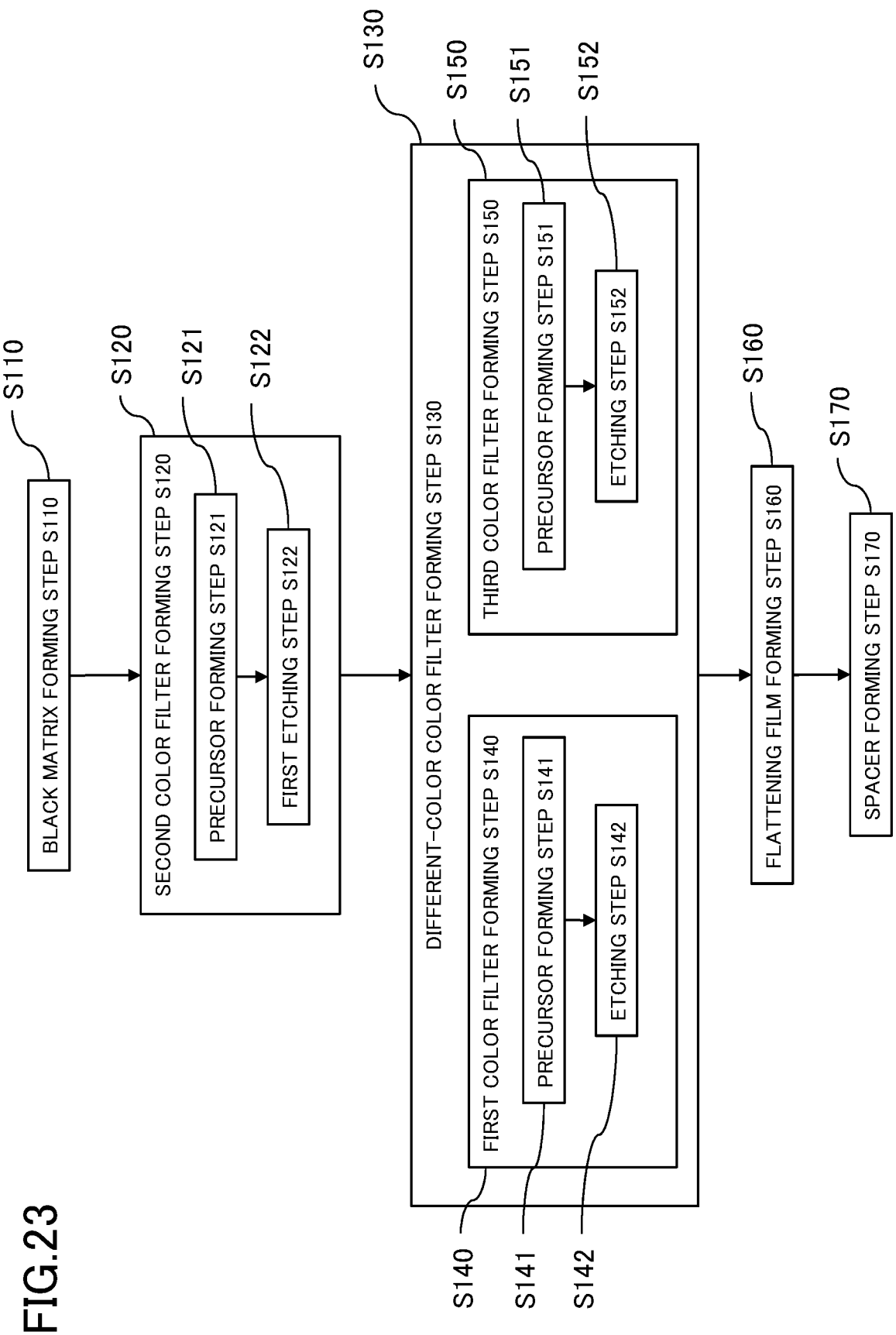
FIG. 23 is a flowchart illustrating a step of forming the counter substrate of a second exemplary embodiment.

FIG. 23 is a flowchart illustrating a step of forming the counter substrate of the second exemplary embodiment. As illustrated in FIG. 23, the step of forming the counter substrate of the second exemplary embodiment includes black matrix forming step S110, second color filter forming step S120, different-color color filter forming step S130, first color filter forming step S140, third color filter forming step S150, flattening film forming step S160, and spacer forming step S170.

Black Matrix Forming Step S110

In black matrix forming step S110, a resist made of a black resin is applied onto the entire first main surface of a transparent substrate such as a glass substrate included in the counter substrate, and black matrix BM in FIG. 16 is manufactured by a photolithography method accompanied with an exposure and development step. Any color resist material may be used regardless of whether the color resist material is a negative type or a positive type as long as the color resist material forms the plurality of openings BMA in FIG. 16 through the exposure and development step.

In the second exemplary embodiment, black matrix BM is formed on the first main surface of the transparent substrate. As illustrated in FIG. 16, black matrix BM includes first opening BMA1, second opening BMA2 adjacent to first opening BMA1 in the first direction, third opening BMA3 that is adjacent to first opening BMA1 in the first direction and is disposed on the side opposite to second opening BMA2 with respect to first opening BMA1, and fifth opening BMA5 that is adjacent to second opening BMA2 in the first direction and is disposed on the side opposite to first opening BMA1 with respect to second opening BMA2.

Second Color Filter Forming Step S120

Subsequently, second color filter forming step S120 is performed. Second color filter forming step S120 includes precursor forming step S121 of forming the second color filter precursor of the second color (for example, blue) and first etching step S122 of removing a part of the second color filter precursor.

Figure 24:
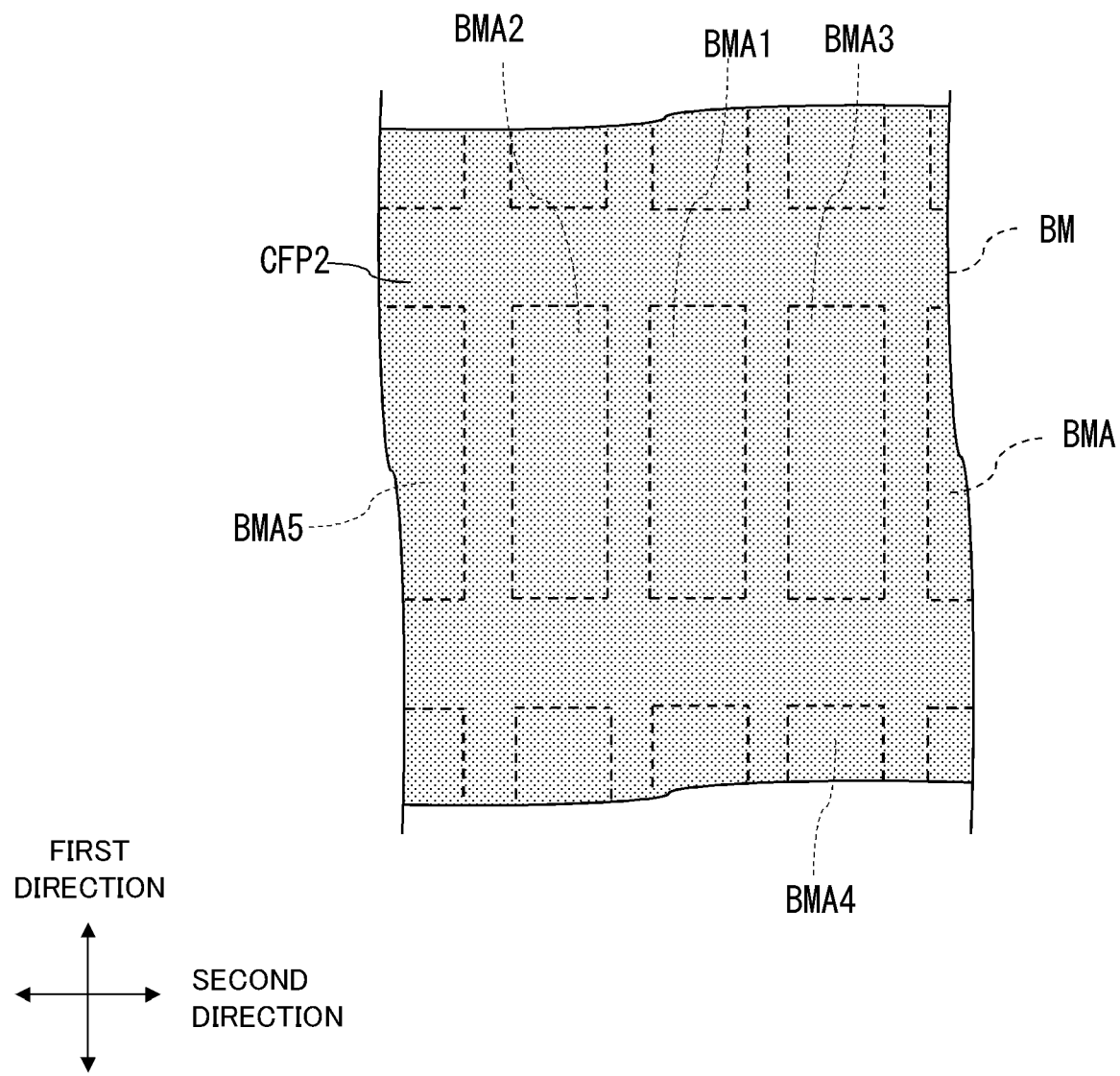
FIG. 24 is a plan view illustrated a manufacturing method of a display device of a second exemplary embodiment.

In precursor forming step S121, as illustrated in FIG. 24, a pigment-based second color resist is applied onto the entire first main surface side of the transparent substrate as second color filter precursor CFP2. In precursor forming step S121, the color resist of the second color covers the entire surface of black matrix BM including opening BMA.

Figure 25:
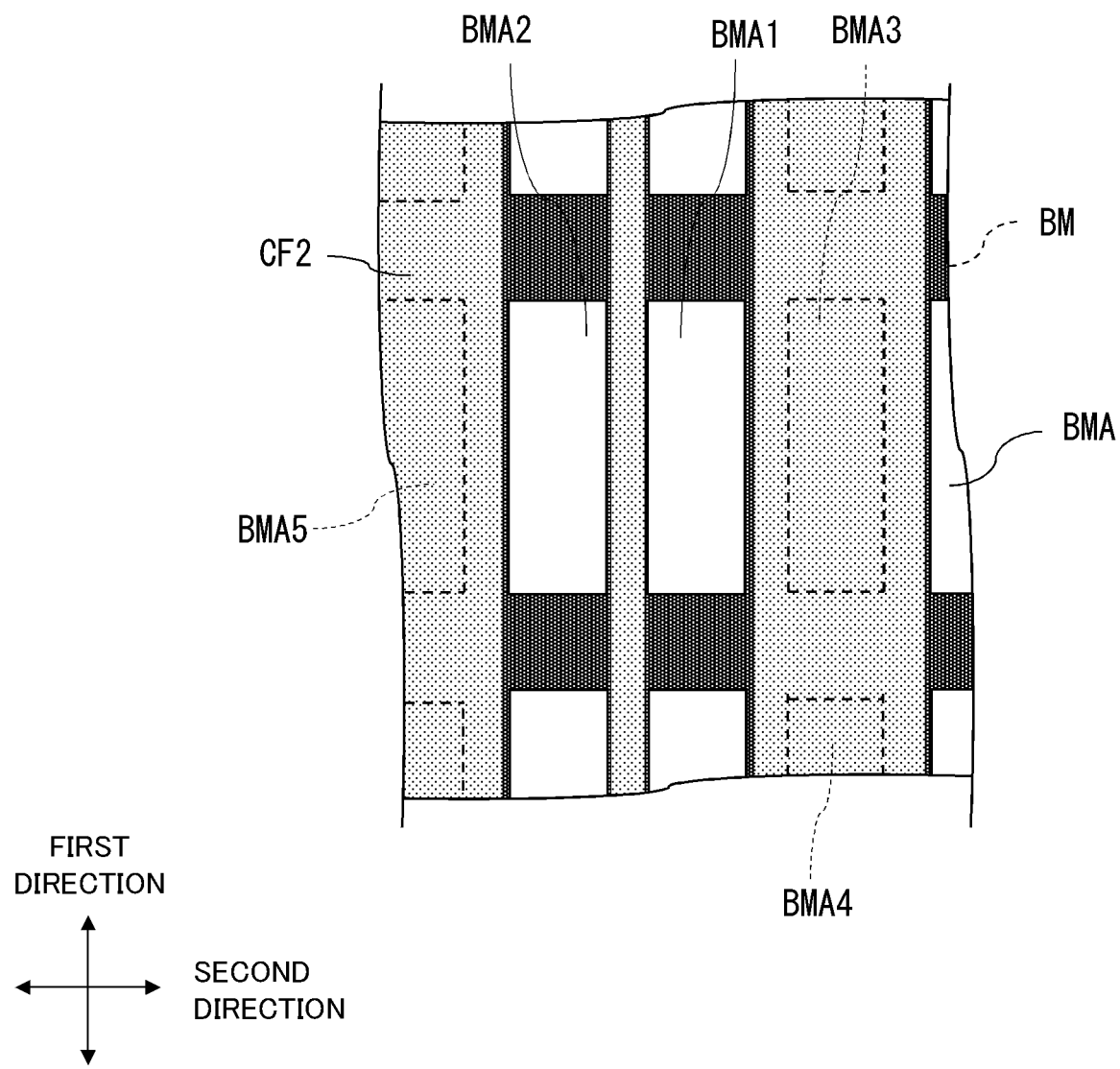
FIG. 25 is a plan view illustrated a manufacturing method of a display device of a second exemplary embodiment.

Subsequently, in first etching step S122, as illustrated in FIG. 25, by the photolithography method accompanied with the exposure and development step, second color filter precursor CFP2 is left in at least a part of the region between first opening BMA1 and second opening BMA2, and second color filter precursor CFP2 is removed from first opening BMA1 and second opening BMA2.

Second color filter CF2 as illustrated in FIG. 25 can be formed through precursor forming step S121 and first etching step S122. Any color resist material may be used regardless of whether the color resist material is a negative type or a positive type as long as the color resist material forms second color filter CF2 in FIG. 25 through the exposure and development step.

Different-Color Color Filter Forming Step S130

Subsequently, step S130 of forming the color filter having the color different from the second color on the entire first main surface side of the transparent substrate is performed. Different-color color filter forming step S130 includes a step of forming a color filter precursor having a color different from the second color on the entire first main surface side of the transparent substrate and a second etching step of etching the color filter precursor having the color different from the second color to leave the color filter precursor having the color different from the second color formed in first opening BMA1 and second opening BMA2.

In the second exemplary embodiment, step S130 of forming the color filter having the color different from the second color includes first color filter forming step S140 of forming the color filter having the first color (for example, red) and third color filter forming step S150 of forming the color filter having the third color (for example, green). First color filter forming step S140 and third color filter forming step S150 may be performed in any order.

First color filter forming step S140 includes precursor forming step S141 of forming the first color filter precursor and etching step S142 of removing a part of the first color filter precursor. Precursor forming step S141 of forming the first color filter precursor is a part of the step of forming the color filter precursor having the color different from the second color, and etching step S142 of removing a part of the first color filter precursor is a part of the second etching step.

Figure 26:
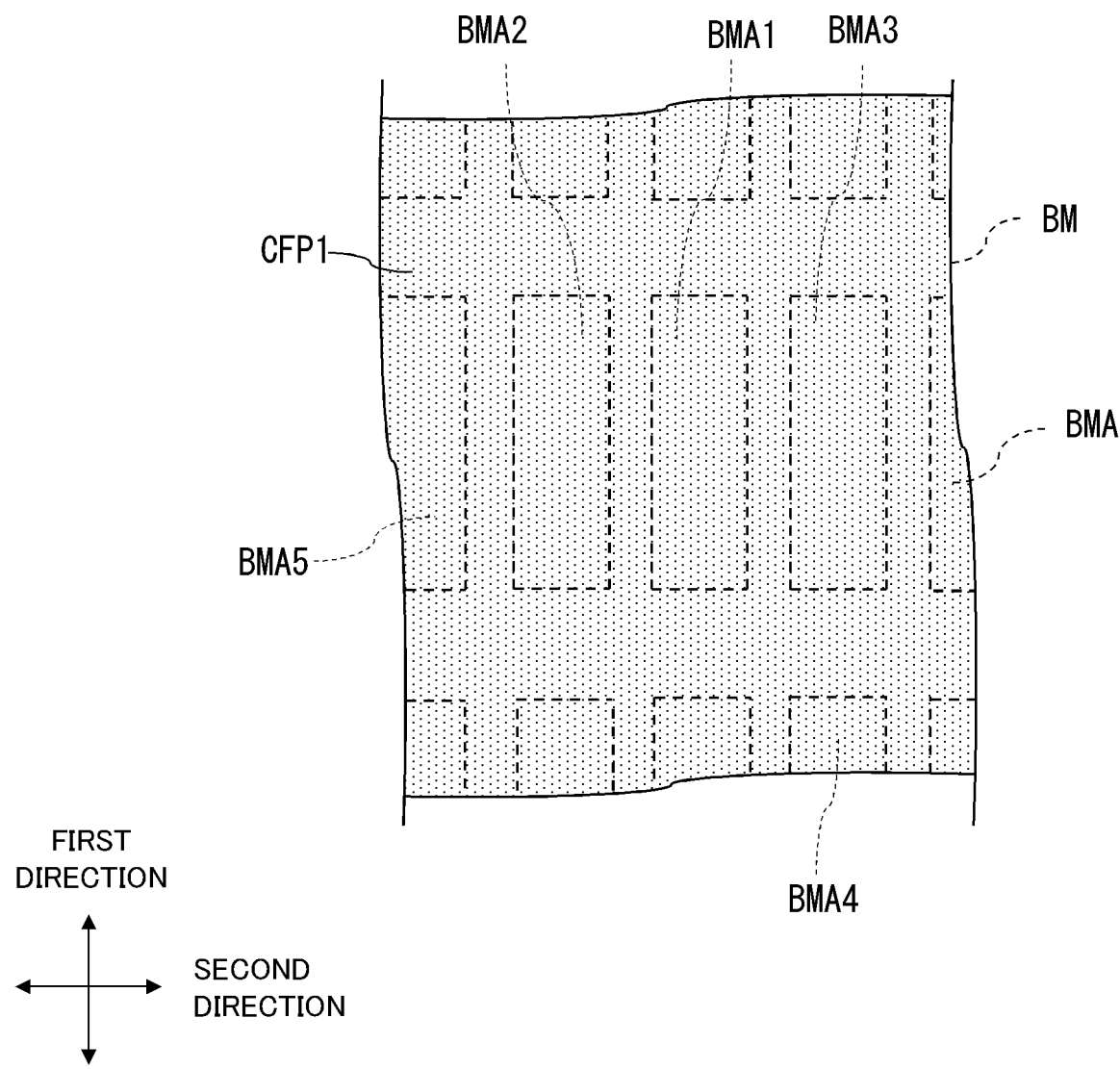
FIG. 26 is a plan view illustrated a manufacturing method of a display device of a second exemplary embodiment.

In precursor forming step S141, as illustrated in FIG. 26, a pigment-based first color resist is applied onto the entire first main surface side of the transparent substrate as first color filter precursor CFP1. In precursor forming step S141, the first color resist covers the entire surfaces of black matrix BM including opening BMA and second color filter CF2.

Figure 27:
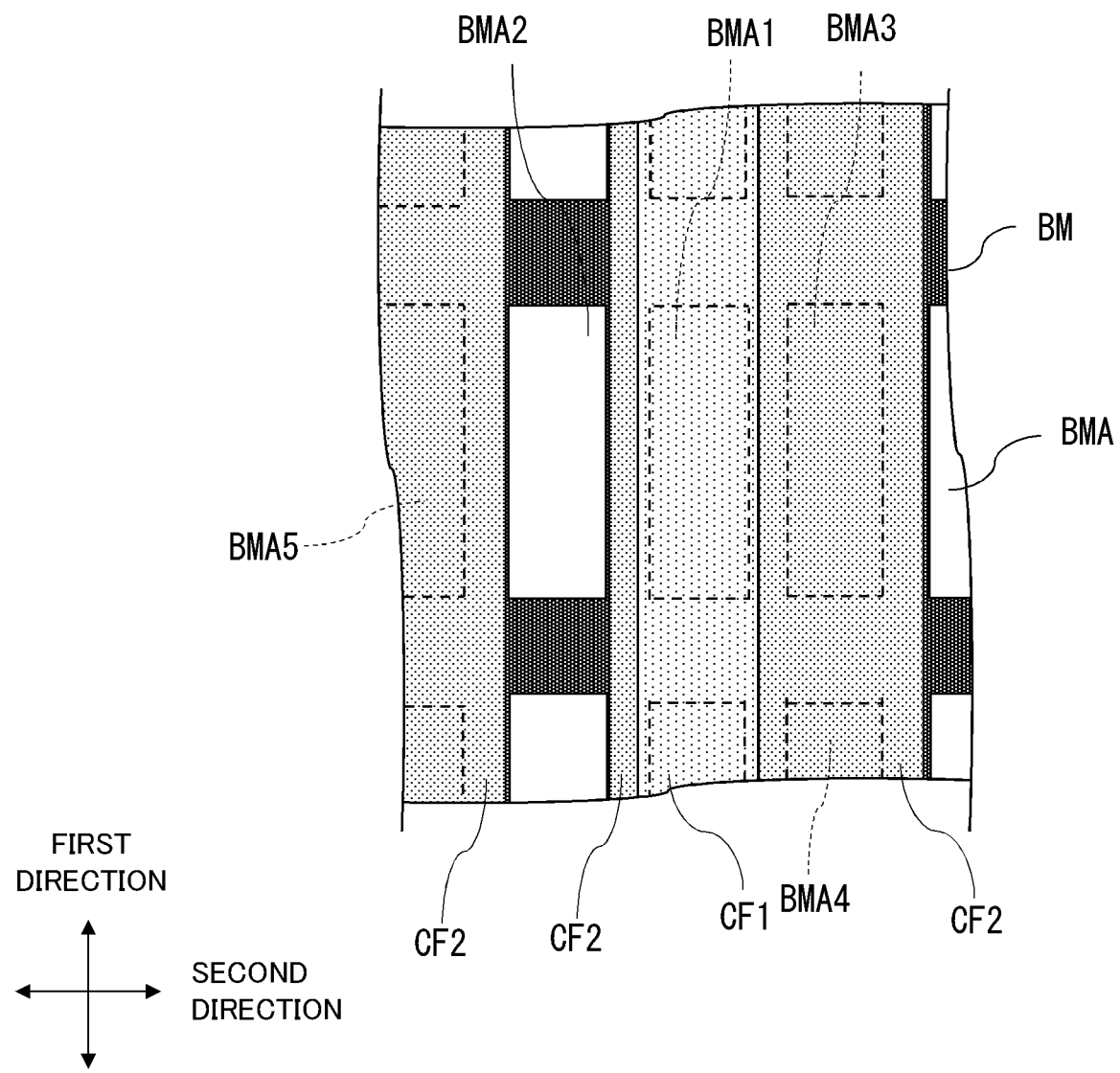
FIG. 27 is a plan view illustrated a manufacturing method of a display device of a second exemplary embodiment.

Subsequently, in etching step S142, by the photolithography method accompanied with the exposure and development step, first color filter precursor CFP1 is etched to leave first color filter precursor CFP1 formed in first opening BMA1 as illustrated in FIG. 27. In other openings BMA, first color filter precursor CFP1 formed in opening BMA may be left when opening BMA corresponding to the pixel of the first color exists.

First color filter CF1 as illustrated in FIG. 27 can be formed through precursor forming step S141 and etching step S142. Any color resist material may be used regardless of whether the color resist material is a negative type or a positive type as long as the color resist material forms first color filter CF1 in FIG. 27 through the exposure and development step.

Third color filter forming step S150 includes precursor forming step S151 of forming the third color filter precursor and etching step S152 of removing a part of the third color filter precursor. Precursor forming step S151 of forming the third color filter precursor is a part of the step of forming the color filter precursor having the color different from the second color, and etching step S152 of removing a part of the third color filter precursor is a part of the second etching step.

Figure 28:
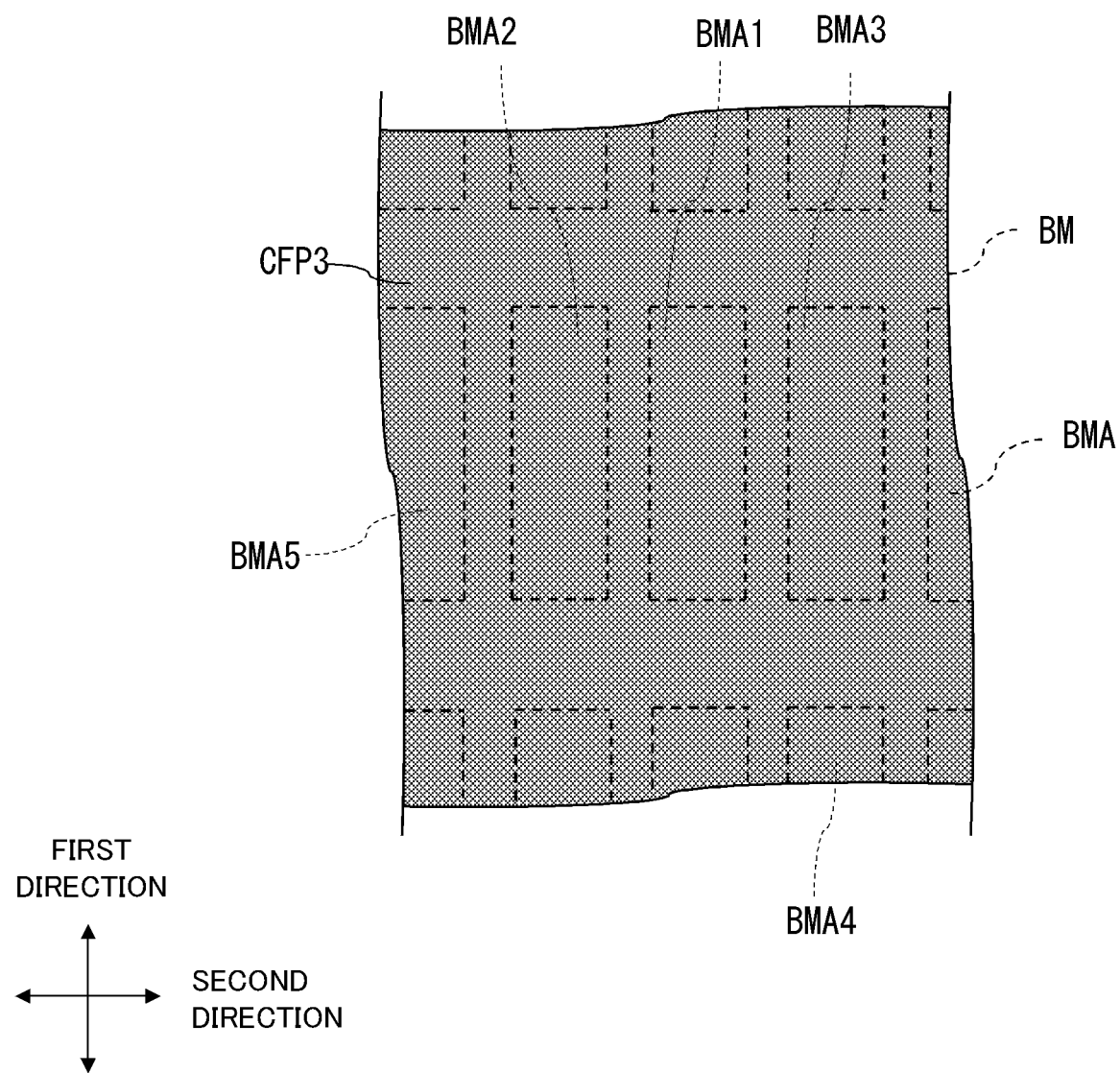
FIG. 28 is a plan view illustrated a manufacturing method of a display device of a second exemplary embodiment.

In precursor forming step S151, as illustrated in FIG. 28, a pigment-based third color resist is applied onto the entire first main surface side of the transparent substrate as third color filter precursor CFP3. In precursor forming step S151, the third color resist covers the entire surfaces of black matrix BM having opening BMA, second color filter CF2, and first color filter CF1.

Subsequently, in etching step S152, by the photolithography method accompanied with the exposure and development step, third color filter precursor CFP3 is etched to leave third color filter precursor CFP3 formed in second opening BMA2 as illustrated in FIG. 17. In other openings BMA, third color filter precursor CFP3 formed in opening BMA may be left when opening BMA corresponding to the pixel of the third color exists.

Third color filter CF3 as illustrated in FIG. 17 can be formed through precursor forming step S151 and etching step S152. Any color resist material may be used regardless of whether the color resist material is a negative type or a positive type as long as the color resist material forms third color filter CF3 in FIG. 17 through the exposure and development step.

Second color filter CF2 can be formed on black matrix BM in which the flatness is maintained by performing second color filter forming step S120 prior to different-color color filter forming step S130, so that second color filter CF2 can be formed with high accuracy. That is, as illustrated in FIG. 17, the position of second color filter CF2 formed between first opening BMA1 and second opening BMA2, between second opening BMA2 and fifth opening BMA5, and between first opening BMA1 and third opening BMA3 is prevented from being displaced in the first direction, which reduces a possibility that second color filter CF2 overlaps with the pixel region of the first color and the pixel region of the third color.

Flattening Film Forming Step S160

Subsequently, flattening film forming step S160 is performed. In flattening film forming step S160, flattening film 64 is formed on the entire first main surface side of the transparent substrate. A known manufacturing method can be used in flattening film forming step S160. Flattening film 64 covers the entire surfaces of second color filter CF2, first color filter CF1, and third color filter CF3.

Spacer Forming Step S170

Finally, spacer forming step S170 is performed. In spacer forming step S170, as illustrated in FIG. 17, first sub-spacer 60B1 is formed between first opening BMA1 and second opening BMA2 while overlapping with second color filter CF2 in planar view.

In the second exemplary embodiment, the plurality of sub-spacers 60B are formed so as to overlap with second color filter CF2 in planar view. Specifically, second sub-spacer 60B2 is formed between first opening BMA1 and third opening BMA3 while overlapping with second color filter CF2 in planar view. Third sub-spacer 60B3 is formed between second opening BMA2 and fifth opening BMA5 while overlapping with second color filter CF2 in planar view. Each sub-spacer 60B can be formed by the photolithography method accompanied with the exposure and development step.

By adopting the above manufacturing method, the generation of the variation in tolerance to the external force from the direction orthogonal to the display surface can be prevented in the display surface of the display panel. That is, as illustrated in FIG. 18 that is the sectional view taken along line B-B in FIG. 17, first sub-spacer 60B1 and second sub-spacer 60B2 are disposed so as to overlap with second color filter CF2 in planar view, so that the distance between each sub-spacer 60B and thin film transistor substrate 230 can be equalized. As a result, the variation in tolerance to the external force from the direction orthogonal to the display surface can be prevented in the display surface of the display panel.

The display devices according to the above embodiments may be combined with each other. In addition, each display device can be applied to various types of display devices.

In the above, the specific embodiments of the present application have been described, but the present application is not limited to the above-mentioned embodiments, and various modifications may be made as appropriate without departing from the spirit of the present application.

What is claimed is:
1. A display device comprising:
a thin film transistor substrate;
a counter substrate disposed to be opposed to the thin film transistor substrate; and
a plurality of spacers protruding from the counter substrate toward the thin film transistor substrate,
wherein the counter substrate includes:
a black matrix including:
a first opening and a second opening that are adjacent to each other in a first direction, and
a fifth opening and sixth opening that are adjacent to each other in the first direction;
a first color filter having a first color, the first color filter being disposed while overlapping with the first opening and the second opening in planar view;
a second color filter having a second color, the second color filter being disposed while overlapping with the fifth opening and the sixth opening in planar view, wherein
the second color filter is disposed while overlapping with at least a part of a region between the first opening and the second opening in planar view,
an entirety of a first spacer included in the plurality of spacers overlaps with the second color filter between the first opening and the second opening in planar view,
the second color filter is disposed while overlapping with at least a part of a region between the fifth opening and the sixth opening in planar view,
a third spacer included in the plurality of spacers is disposed between the fifth opening and the sixth opening while overlapping with the second color filter in planar view,
the fifth opening and the first opening are adjacent to each other in a second direction interesting the first direction,
the second color filter is disposed while overlapping with at least a part of a region between the fifth opening and the first opening in planar view, and
a fourth spacer included in the plurality of spacers is disposed between the fifth opening and the first opening while overlapping with the second color filter in planar view.

2. The display device according to claim 1, wherein
the black matrix further includes a third opening and a fourth opening that are adjacent to each other in the first direction,
the counter substrate further includes a third color filter having a third color, the third color filter being disposed while overlapping with the third opening and the fourth opening in planar view,
the second color filter is disposed while overlapping with at least a part of a region between the third opening and the fourth opening in planar view, and
a second spacer included in the plurality of spacers is disposed between the third opening and the fourth opening while overlapping with the second color filter in planar view.

3. The display device according to claim 2, wherein
the first opening and the third opening are adjacent to each other in the second direction, and
a distance between the first opening and the fifth opening in the second direction is greater than a distance between the first opening and the third opening in the second direction.

4. The display device according to claim 2, wherein
the third color filter is disposed between the first opening and the second opening while overlapping with the second color filter in planar view, and
the first spacer is disposed between the first opening and the second opening while overlapping with the second color filter and the third color filter in planar view.

5. The display device according to claim 2, wherein an entirety of the second spacer overlaps with the second color filter in planar view.

6. The display device according to claim 2, wherein the entirety of the first spacer overlaps with the second color filter and the third color filter in planar view.

7. The display device according to claim 1, wherein
the first color filter is disposed between the first opening and the second opening while overlapping with the second color filter in planar view, and
the first spacer is disposed between the first opening and the second opening while overlapping with the first color filter and the second color filter in planar view.

8. The display device according to claim 7, wherein the entirety of the first spacer overlaps with the first color filter and the second color filter in planar view.

9. The display device according to claim 1, wherein an entirety of the fourth spacer overlaps with the second color filter in planar view.

10. The display device according to claim 1, wherein an entirety of the third spacer overlaps with the second color filter in planar view.

11. A display device comprising:
a thin film transistor substrate;
a counter substrate disposed to be opposed to the thin film transistor substrate; and
a plurality of spacers protruding from the counter substrate toward the thin film transistor substrate,
wherein the counter substrate includes:
  a black matrix including a first opening, a second opening, and a third opening, the second opening being adjacent to the first opening in a first direction, the third opening being adjacent to the first opening in the first direction and disposed opposite to the second opening with respect to the first opening;
  a first color filter having a first color, the first color filter being disposed while overlapping with the first opening in planar view;
  a third color filter having a third color, the third color filter being disposed while overlapping with the second opening in planar view; and
  a second color filter having a second color, the second color filter being disposed while overlapping with at least a part of a region between the first opening and the second opening, and with the third opening in planar view, and
wherein an entirety of first spacer included in the plurality of spacers overlaps with the second color filter between the first opening and the second opening in planar view.

12. The display device according to claim 11, wherein
the second color filter is disposed while overlapping with at least a part of a region between the first opening and the third opening in planar view, and
a second spacer included in the plurality of spacers is disposed between the first opening and the third opening while overlapping with the second color filter in planar view.

13. The display device according to claim 12, wherein a distance between the first opening and the third opening in the first direction is greater than a distance between the first opening and the second opening in the first direction.

14. The display device according to claim 12, wherein
the third color filter is disposed while overlapping with at least a part a region between the first opening and the third opening in planar view, and
the second spacer is disposed between the first opening and the third opening while overlapping with the second color filter and the third color filter in planar view.

15. The display device according to claim 12, wherein an entirety of the second spacer overlaps with the second color filter in planar view.

16. The display device according to claim 14, wherein
the first color filter is disposed between the first opening and the second opening while overlapping with the second color filter in planar view, and
the first spacer is disposed between the first opening and the second opening while overlapping with the first color filter and the second color filter in planar view.

17. The display device according to claim 11, wherein
the black matrix further includes a fourth opening adjacent to the third opening in a second direction intersecting the first direction,
the first color filter is disposed while overlapping with at least a part of a region between the third opening and the fourth opening in planar view, and
a third spacer included in the plurality of spacers is disposed between the third opening and the fourth opening while overlapping with the first color filter in planar view.

* * * * *